US011335033B2

United States Patent
Patel et al.

(10) Patent No.: US 11,335,033 B2
(45) Date of Patent: May 17, 2022

(54) COMPRESSING DIGITAL IMAGES UTILIZING DEEP LEARNING-BASED PERCEPTUAL SIMILARITY

(71) Applicant: Adobe Inc., San Jose, CA (US)

(72) Inventors: Meet Patel, Gandhinagar (IN); Mayur Hemani, Delhi (IN); Karanjeet Singh, Delhi (IN); Amit Gupta, Noida (IN); Apoorva Gupta, Bangalore (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/032,704

(22) Filed: Sep. 25, 2020

(65) Prior Publication Data

US 2022/0101564 A1    Mar. 31, 2022

(51) Int. Cl.
*G06K 9/00*    (2006.01)
*G06T 9/00*    (2006.01)
*G06T 7/00*    (2017.01)
*G06N 3/08*    (2006.01)

(52) U.S. Cl.
CPC ............. *G06T 9/002* (2013.01); *G06N 3/08* (2013.01); *G06T 7/0002* (2013.01); *G06T 2207/20081* (2013.01); *G06T 2207/20084* (2013.01); *G06T 2207/20224* (2013.01)

(58) Field of Classification Search
CPC ............. G06T 9/002; G06T 7/0002; G06T 2207/20081; G06T 2207/20224; G06N 3/08

USPC ......................................................... 382/232
See application file for complete search history.

(56) References Cited

U.S. PATENT DOCUMENTS

| 5,426,512 | A | * | 6/1995 | Watson | ................ | H04N 19/176 375/E7.13 |
| 10,728,553 | B2 | * | 7/2020 | Xu | ........................ | H04N 19/124 |
| 10,735,756 | B2 | * | 8/2020 | Minoo | ................ | H04N 19/124 |

(Continued)

OTHER PUBLICATIONS

Chen, Li-Heng, et al. "Perceptually optimizing deep image compression." arXiv preprint arXiv:2007.02711 (2020). (Year: 2020).*

(Continued)

*Primary Examiner* — Jonathan S Lee
(74) *Attorney, Agent, or Firm* — Keller Preece PLLC

(57) ABSTRACT

Methods, systems, and non-transitory computer readable storage media are disclosed for utilizing deep learning to intelligently determine compression settings for compressing a digital image. For instance, the disclosed system utilizes a neural network to generate predicted perceptual quality values for compression settings on a compression quality scale. The disclosed system fits the predicted compression distortions to a perceptual distortion characteristic curve for interpolating predicted perceptual quality values across the compression settings on the compression quality scale. Additionally, the disclosed system then performs a search over the predicted perceptual quality values for the compression settings along the compression quality scale to select a compression setting based on a perceptual quality threshold. The disclosed system generates a compressed digital image according to compression parameters for the selected compression setting.

20 Claims, 12 Drawing Sheets

(56) References Cited

U.S. PATENT DOCUMENTS

2019/0020871 A1* 1/2019 Xu .................. G06N 3/084

OTHER PUBLICATIONS

Weber, Maurice, et al. "Lossy image compression with recurrent neural networks: from human perceived visual quality to classification accuracy." arXiv preprint arXiv:1910.03472 (2019). (Year: 2019).*

Talukder et al. "Haar Wavelet Based Approach for Image Compression and Quality Assessment of Compressed Image"; Oct. 20, 2010; https://arxiv.org/pdf/1010.4084.pdf.

Reisenhofer et al.; "A Haar Wavelet-Based Perceptual Similarity Index for Image Quality Assessment"; Jul. 20, 2016; https://www.math.tu-berlin.de/fileadmin/i26_fg-kutyniok/Kutyniok/Papers/HaarPSI.pdf.

Wikipedia: The Free Encyclopedia; "JPEG"; Date downloaded Sep. 28, 2020 https://en.wikipedia.org/wiki/JPEG.

Wikipedia: The Free Encyclopedia; "WebP"; Date downloaded Sep. 28, 2020; https://en.wikipedia.org/wiki/WebP.

Adobe: Assets Guide; "Smart Imaging"; Date downloaded Sep. 28, 2020; https://docs.adobe.com/content/help/en/experience-manager-64/assets/dynamic/imaging-faq.html.

Alakuijala et al.; "Guetzli: Perceptually Guided JPEG Encoder"; Mar. 13, 2017; https://arxiv.org/abs/1703.04421.

GitHub; google/butteraugli; "A tool for measuring perceived differences between images" Date downloaded Sep. 28, 2020; https://github.com/google/butteraugli.

Reisenhofer et al. "A Haar Wavelet-Based Perceptual Similarity Index for Image Quality Assessment"; Nov. 6, 2017; https://arxiv.org/pdf/1607.06140.pdf.

Wikipedia: The Free Encyclopedia; "Peak signal-to-noise ratio" Date downloaded Sep. 28, 2020; https://en.wikipedia.org/wiki/Peak_signal-to-noise_ratio.

Wikipedia: The Free Encyclopedia; "Structural similarity" Date downloaded Sep. 28, 2020; https://en.wikipedia.org/wiki/Structural_similarity.

Z. Wang, E. P. Simoncelli and A. C. Bovik, "Multiscale structural similarity for image quality assessment," The Thrity-Seventh Asilomar Conference on Signals, Systems & Computers, Nov. 9-12, 2003, Pacific Grove, CA, USA, 2003, pp. 1398-1402 vol. 2.

Zhang et al.; "The Unreasonable Effectiveness of Deep Features as a Perceptual Metric"; Date downloaded Apr. 10, 2018; https://arxiv.org/pdf/1801.03924.pdf.

\* cited by examiner

COMPRESSING DIGITAL IMAGES UTILIZING DEEP LEARNING-BASED PERCEPTUAL SIMILARITY

BACKGROUND

Improvements to computer processing technologies have led to significant advancements in the field of image processing. Specifically, computer processing speeds and resources have provided many different types of systems the ability to process and manipulate digital images. For example, systems use image processing to compress digital images for reducing image storage sizes to use in a variety of contexts. To illustrate, many systems utilize image compression for online storage or presentation via websites to reduce data transmission sizes and loading times. In many cases, reducing data transmission sizes and loading times for websites can significantly improve device performance, especially for devices with limited data transfer speeds or processing capabilities.

Existing image compression algorithms (JPEG, WebP, etc.) allow the specification of a quality number based on which different parameters of the algorithm are decided. The choice of this quality number is often left to the user which is hitherto the only method for deciding if an image has an acceptable quality. Choosing the wrong quality number can either result in poor visual quality or inadequate compression. This can be a problem, particularly for bulk cases where large collections of images need to be compressed, sometimes on the fly, without any human intervention.

SUMMARY

This disclosure describes one or more embodiments of methods, non-transitory computer readable media, and systems that utilize deep learning to intelligently determine compression settings for compressing a digital image. In particular, the disclosed systems automatically determine (e.g., without requiring user input) compression settings for compressing digital images that are content aware (e.g., based on the images themselves). For instance, the disclosed systems utilize a neural network to generate points indicating predicted compression distortions (e.g., Haar wavelet-based perceptual similarity index values) for compression settings on a compression quality scale. The disclosed systems then fit the predicted compression distortions to a perceptual distortion characteristic curve to interpolate points indicating predicted compression distortions across a range of compression settings on the compression quality scale. The disclosed systems perform a search over the generated points and interpolated points for the range of compression settings to select a compression setting based on a perceptual quality threshold. Additionally, the disclosed systems then generate a compressed digital image according to compression parameters for the selected compression setting. Accordingly, the disclosed systems provide an efficient, flexible tool to easily and quickly compress digital images while maintaining high quality images.

BRIEF DESCRIPTION OF THE DRAWINGS

The detailed description refers to the drawings briefly described below.

DETAILED DESCRIPTION

Figure 1:
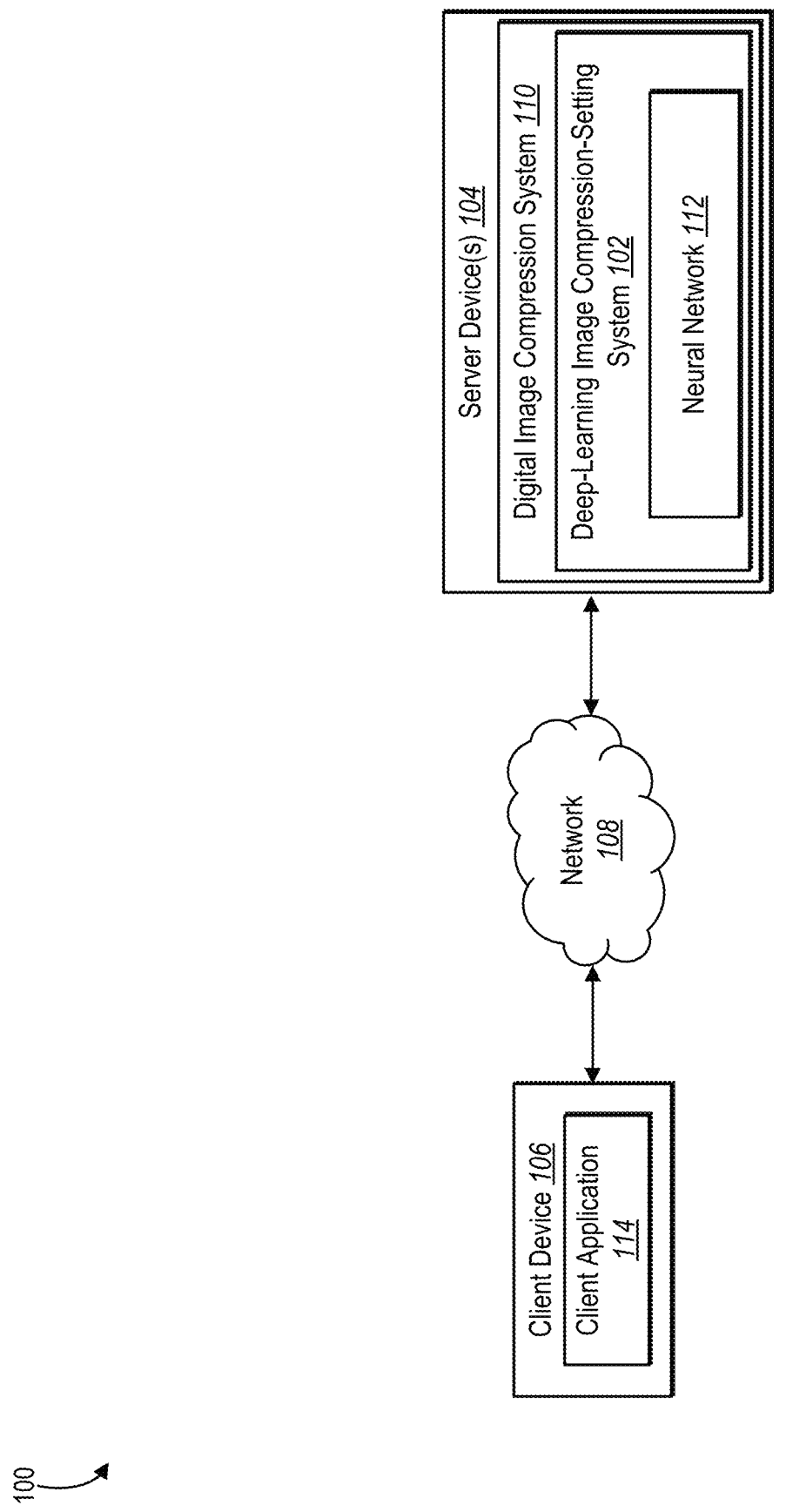
FIG. 1 illustrates a block diagram of a system environment in which a deep-learning image compression-setting system can operate in accordance with one or more implementations.

One or more embodiments of the present disclosure include a deep-learning image compression-setting system that utilizes a neural network to intelligently determine compression settings for compressing digital images. Specifically, the deep-learning image compression-setting system utilizes a neural network to generate predictions of compression distortions for compressing a digital image using a number of different compression settings. For example, for compression algorithms that utilize a selectable quality number to determine compression parameters, the deep-learning image compression-setting system utilizes the neural network to generate a plurality of points indicating predicted compression distortions (e.g., Haar-PSI values) corresponding to possible compressed image versions. The deep-learning image compression-setting system fits the predicted points to a perceptual distortion characteristic curve and then interpolates the points to other compression settings within a compression quality scale. Additionally, the deep-learning image compression-setting system performs a quality search across compression settings of the compression quality scale (e.g., utilizing a bisection search) to select a compression setting meeting a perceptual quality threshold. Accordingly, the deep-learning image compression-setting system generates a compressed digital image utilizing the selected compression setting such that the compressed digital image remains perceptually similar to the original image.

As mentioned, in one or more embodiments, the deep-learning image compression-setting system utilizes a neural network to generate a plurality of points indicating predicted compression distortions for a plurality of possible compressed versions of a digital image. For instance, the deep-learning image compression-setting system utilizes the neural network to generate a plurality of points (e.g., Haar-PSI values to indicate perceptual similarity) for possible compressed versions corresponding to different compression settings along a compression quality scale. In one or more embodiments, the compression settings are equidistant along a compression setting scale (e.g., at setting value increments corresponding to a predetermined value of 5 along a 100-point scale). Accordingly, in one or more embodiments, the deep-learning image compression-setting system generates a predetermined number of points indicating predicted compression distortion levels/values for a predetermined number of possible compressed images corresponding to the predetermined number of different compression settings.

Additionally, in one or more embodiments, the deep-learning image compression-setting system determines a perceptual distortion characteristic curve based on the points generated by the neural network. In particular, the deep-learning image compression-setting system fits a curve to the plurality of points within the compression quality scale. In some embodiments, the deep-learning image compression-setting system fits a fifth-degree polynomial with regularization to the points to generate a smooth curve across a possible range of compression settings within the compression quality scale.

After determining a perceptual distortion characteristic curve, in one or more embodiments, the deep-learning image compression-setting system interpolates a fitted perceptual distortion characteristic curve at a plurality of additional points along a compression quality curve. For instance, by fitting a curve to equidistant points along the compression quality curve, the deep-learning image compression-setting system determines additional predicted compression distortions for a plurality of additional possible compressed versions of the digital image. Specifically, the additional possible compressed versions correspond to compression settings intermediate to the compression settings for which the neural network generates the plurality of points. Thus, in some embodiments, the deep-learning image compression-setting system determines predicted compression distortions for all possible compressed versions of the digital image.

In one or more embodiments, the deep-learning image compression-setting system utilizes points generated by neural network and interpolated points to select a compression setting for compressing a digital image. For example, the deep-learning image compression-setting system selects a compression setting that results in a desired compression quality, such as by comparing the predicted compression distortions to a perceptual quality threshold. In some embodiments, the deep-learning image compression-setting system performs a search (e.g., a bisection search) over the compression quality scale to select a lowest compression setting for which the corresponding predicted compression distortion meets the perceptual quality threshold.

In response to selecting a compression setting for a digital image, the deep-learning image compression-setting system utilizes the selected compression setting to generate a compressed digital image. In one or more embodiments, the deep-learning image compression-setting system determines compression parameters corresponding to the selected compression setting. The deep-learning image compression-setting system then generates the compressed digital image by utilizing a compression algorithm configured with the determined compression parameters.

Some conventional systems that perform image compression provide graphical interface tools for allowing users to manually select a compression setting when compressing a digital image. For example, such conventional systems provide a slider or input element to select a specific compression setting from a scale of possible compression settings. By compressing digital images based on a manually selectable compression setting, the conventional systems provide users with significant control over the compression setting of the final compressed image. While such control can be useful for experienced users when compressing individual images, however, these conventional systems lack efficiency when compressing digital images in bulk.

Furthermore, requiring manual selection of compression quality typically requires a significant amount of trial and error to obtain a good balance between compression and quality, particularly for inexperienced users. For instance, selecting a compression setting that is too low for a given digital image can result in poor visual quality in the compressed image. Alternatively, selecting a compression setting that is too high for a given digital image can result in higher storage size than compressed versions with lower compression setting and similar visual quality.

Some existing systems modify a specific type of compression algorithm (e.g., a JPEG compression algorithm) to dynamically generate high-quality compressed images according to a perceptual difference using a distance metric based on the human visual system. Although such existing systems provide high-quality visual compression for images of the specific type of compression algorithm, the conventional systems lack flexibility because the compression algorithm modification is not usable for other compression algorithms. Additionally, these conventional systems are inefficient because the dynamic compression requires significant time and resources and are thus not practical for use in bulk or real-time compression scenarios.

The disclosed deep-learning image compression-setting system provides a number of advantages over existing systems. For example, the deep-learning image compression-setting system improves the efficiency of computing systems that compress digital images. To illustrate, while some existing systems utilize manual selection of compression setting for compressing digital images, the deep-learning image compression-setting system utilizes a neural network to intelligently select compression settings for compressing digital images. Specifically, by generating predicted compression distortions for generating a perceptual distortion characteristic curve to use in automatically selecting compression settings, the deep-learning image compression-setting system quickly and efficiently selects optimal compression settings to balance of quality and compression. Furthermore, the deep-learning image compression-setting system intelligently utilizes a fast bisection search to select compression qualities based on a perceptual distortion characteristic curve generated by a neural network without requiring significant computing resources.

Additionally, the deep-learning image compression-setting system improves flexibility of computing systems that perform image compression. In contrast to existing systems that modify a specific compression algorithm to optimize an image compression size and perceptual quality, the deep-learning image compression-setting system intelligently selects compression settings for any compression system that exposes an ordered set of settings corresponding to compression quality (e.g., JPEG, WebP). For instance, the deep-learning image compression-setting system utilizes a neural network with parameters learned for any type of compression algorithm to determine a perceptual distortion characteristic curve. Thus, the deep-learning image compression-setting system flexibly provides intelligent selection of compression settings without being restricted to a single compression algorithm.

As illustrated by the foregoing discussion, the present disclosure describes various features and advantages of the deep-learning image-compression setting determination system. As used in this disclosure, for example, the terms "digital image" and "image" refer to a computer-representation of visual content. In one or more embodiments, a digital image includes, but is not limited to, a digital photograph, a digital video frame, a computer-generated image, or a digitally scanned image.

As used herein, the terms "compressed digital image," "compressed image," and "compressed version of a digital image" refer to a digital image that has been modified using a compression algorithm to reduce a storage size of the digital image. For example, a compressed digital image includes, but is not limited to, a digital image stored as a JPEG image or a WebP image. In one or more embodiments, generating a compressed digital image includes utilizing a compression algorithm (e.g., a JPEG compression algorithm or a WebP compression algorithm) to compress a digital image. Furthermore, in one or more embodiments, a compressed digital image includes a compressed version of an original image (e.g., stored in an original format when the image is generated) or a previously compressed version of an image.

As used herein, the term "compression distortion" refers to a measurement of visual similarity of a digital image relative to a compressed version of the digital image. In one or more embodiments, compression distortion includes a perceptual quality value such as a Haar wavelet-based perceptual similarity index ("Haar-PSI") value, which indicates a perceptual similarity between two images (e.g., an uncompressed digital image and a compressed digital image) with respect to a human viewer as described by Rafael Reisenhofer, Sebastian Bosse, Gitta Kutyniok, and Thomas Wiegand in "A Haar wavelet-based perceptual similarity index for image quality assessment" in Signal Processing: Image Communication, 2018, which is hereby incorporated by reference in its entirety. For example, a higher Haar-PSI value indicates less compression distortion, while a lower Haar-PSI value indicates more compression distortion. In alternative embodiments, a compression distortion includes a different distortion value such as a structural similarity index value. Additionally, as used herein, the term "predicted compression distortion" refers to an estimated perceptual similarity between an uncompressed digital image and a compressed digital image. In particular, a neural network generates a predicted compression distortion associated with a possible compressed version of a digital image without generating the possible compressed version of the digital image.

As used herein, the term "perceptual distortion curve" refers to a mathematical function representing a plurality of compression distortions or predicted compression distortions. For example, a perceptual distortion curve includes a curve (e.g., a fifth-degree polynomial) fitted to a plurality of points generated by a neural network that predicts compression distortion for a plurality of possible compressed versions of a digital image. To illustrate, a perceptual distortion curve includes a curve fitted to a plurality of Haar-PSI values representing perceptual differences between a plurality of compressed images and their corresponding uncompressed images.

As used herein, the term "compression quality scale" refers to a numerical scale including a plurality of discrete values associated with a compression algorithm. In one or more embodiments, a compression quality scale includes a plurality of values based on the specific compression algorithm. For example, a compression quality scale includes compression settings that determine parameters for compressing a digital image to obtain a specific compression quality. To illustrate, a compression quality scale associated with a plurality of values indicating percentage of compression to apply to a digital image (e.g., from 1%-100%), such that a low value indicates a low-quality compressed image and a high value indicates a high-quality compressed image. Accordingly, as used herein, the term "compression setting" refers to a value on a compression quality scale.

As used herein, the term "perceptual quality threshold" refers to a threshold value of perceptual similarity between a digital image and a compressed digital image. For instance, a perceptual quality threshold includes a specific perceptual quality value for a compressed digital image. In one or more embodiments, a perceptual quality threshold includes a Haar-PSI value, such as a minimum Haar-PSI value when compressing a digital image.

Furthermore, as used herein, the term "neural network" refers to a computer representation that can be tuned (e.g., trained) based on inputs to approximate unknown functions. For instance, a neural network includes one or more layers or artificial neurons that approximate unknown functions by analyzing known data at different levels of abstraction. In some embodiments, a neural network includes one or more neural network layers including, but not limited to, a convolutional neural network, a recurrent neural network, or a neural network including full-connected layers. In one or more embodiments, a neural network includes, but is not limited to, a convolutional neural network including one or more blocks of neural network layers and/or activation layers to generate points indicating predicted compression distortions for possible compressed versions of digital images.

Turning now to the figures, FIG. 1 illustrates a schematic diagram of a system environment 100 in which a deep-learning image compression-setting system 102 operates. In particular, the system environment 100 includes server device(s) 104 and a client device 106 in communication via a network 108. Moreover, as shown, the server device(s) 104 include a digital image compression system 110, which includes the deep-learning image compression-setting system 102. Additionally, the deep-learning image compression-setting system 102 includes a neural network 112. Furthermore, the client device 106 includes a client application 114 (e.g., a digital image editing application).

As shown in FIG. 1, the server device(s) 104 includes or host the digital image compression system 110. In one or more embodiments, the digital image compression system 110 includes, or is part of, one or more systems that implement the management of digital images for storing, creating, modifying, or displaying digital images for one or more users of the digital image compression system 110. For example, the digital image compression system 110 provides tools for viewing, generating, editing, or otherwise interacting with digital images using one or more graphical user interface tools via the client application 114 on the client device 106. In some embodiments, the digital image compression system 110 provides a graphical user interface (e.g., within a web browser) to the client device 106 for a user to interact with digital content items via the client application 114 on the client device 106.

As mentioned, the digital image compression system 110 provides tools for generating, editing, or otherwise interacting with digital designs. In one or more embodiments, the digital image compression system 110 provides tools for compressing digital images via one or more compression algorithms. To illustrate, the digital image compression system 110 provides tools for compressing digital images to use in connection with reducing the storage sizes of the digital images. For example, the digital image compression system 110 utilizes compressed digital images in a variety of applications including, but not limited to, website development, cloud storage management, or image content analysis systems. In at least some embodiments, the digital image compression system 110 provides tools for compressing a large number of digital images, such as in batch compression processes.

In connection with compressing digital images, the digital image compression system 110 includes the deep-learning image compression-setting system 102 to determine compression parameters for automatically compressing digital images. To illustrate, the deep-learning image compression-setting system 102 includes a neural network 112 to process digital images and generate predicted compression distortions for digital images prior to use in selecting compression settings. For instance, the deep-learning image compression-setting system 102 utilizes the neural network 112 to determine a perceptual distortion characteristic curve for possible compressed versions of a digital image. The deep-learning image compression-setting system 102 then utilizes the perceptual distortion characteristic curve (e.g., by performing a search over values in the curve) to determine compression settings that result in a compressed image with an image quality with a perceptual similarity to the original image that meets a threshold.

In addition, as shown in FIG. 1, the system environment 100 includes the client device 106. In one or more embodiments, the client device 106 includes, but is not limited to, a mobile device (e.g., smartphone or tablet), a laptop, or a desktop, including those explained below with reference to FIG. 10. Furthermore, although not shown in FIG. 1, in one or more embodiments, the client device 106 is operated by a user (e.g., a user included in, or associated with, the system environment 100) to perform a variety of functions. In particular, the client device 106 performs functions, such as, but not limited to, accessing, viewing, and interacting with digital images (e.g., via the client application 114). Additionally, in some embodiments, the client device 106 performs functions for generating and editing digital images to provide to the digital image compression system 110 or another system via the network 108. In one or more embodiments, the deep-learning image compression-setting system 102 receives image data from the client device for compressing the digital images using intelligently selected compression settings. Although FIG. 1 illustrates the system environment 100 with a single client device 106, in some embodiments, the system environment 100 includes a different number of client devices.

In one or more embodiments, the server device(s) 104 include a variety of computing devices, including those described below with reference to FIG. 10. For example, the server device(s) 104 includes one or more servers for storing and processing data associated with digital content items (e.g., digital images) associated with a plurality of users of the deep-learning image compression-setting system 102. In some embodiments, the server device(s) 104 also include a plurality of computing devices in communication with each other, such as in a distributed storage environment. In some embodiments, the server device(s) 104 comprise a content server for storing digital images. In additional embodiments, the server device(s) 104 also comprises an application server, a communication server, a web-hosting server, a social networking server, a digital content campaign server, or a digital communication management server.

Additionally, as shown in FIG. 1, the system environment 100 includes the network 108. The network 108 enables communication between components of the system environment 100. In one or more embodiments, the network 108 may include the Internet or World Wide Web. Additionally, in some embodiments, the network 108 includes various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, in one or more embodiments, the server device(s) 104 and the client device 106 communicate via the network using a variety of communication platforms and technologies suitable for transporting data and/or communication signals, including any known communication technologies, devices, media, and protocols supportive of data communications, examples of which are described with reference to FIG. 10. Although FIG. 1 illustrates the server device(s) 104 and the client device 106 communicating via the network 108, in one or more embodiments, the various components of the system environment 100 communicate and/or interact via other methods (e.g., the server device(s) 104 and the client device 106 communicate directly).

Furthermore, although FIG. 1 illustrates the deep-learning image compression-setting system 102 being implemented by a particular component and/or device within the system environment 100, in one or more embodiments, the deep-learning image compression-setting system 102 is implemented, in whole or in part, by other computing devices and/or components in the system environment 100 (e.g., the client device 106). For example, rather than the digital image compression system 110 and deep-learning image compression-setting system 102 being hosted on the server device(s) 104 and supporting the client application 114, the digital image compression system 110 and deep-learning image compression-setting system 102 can be resident and run directly on the client device 106.

Figure 2:
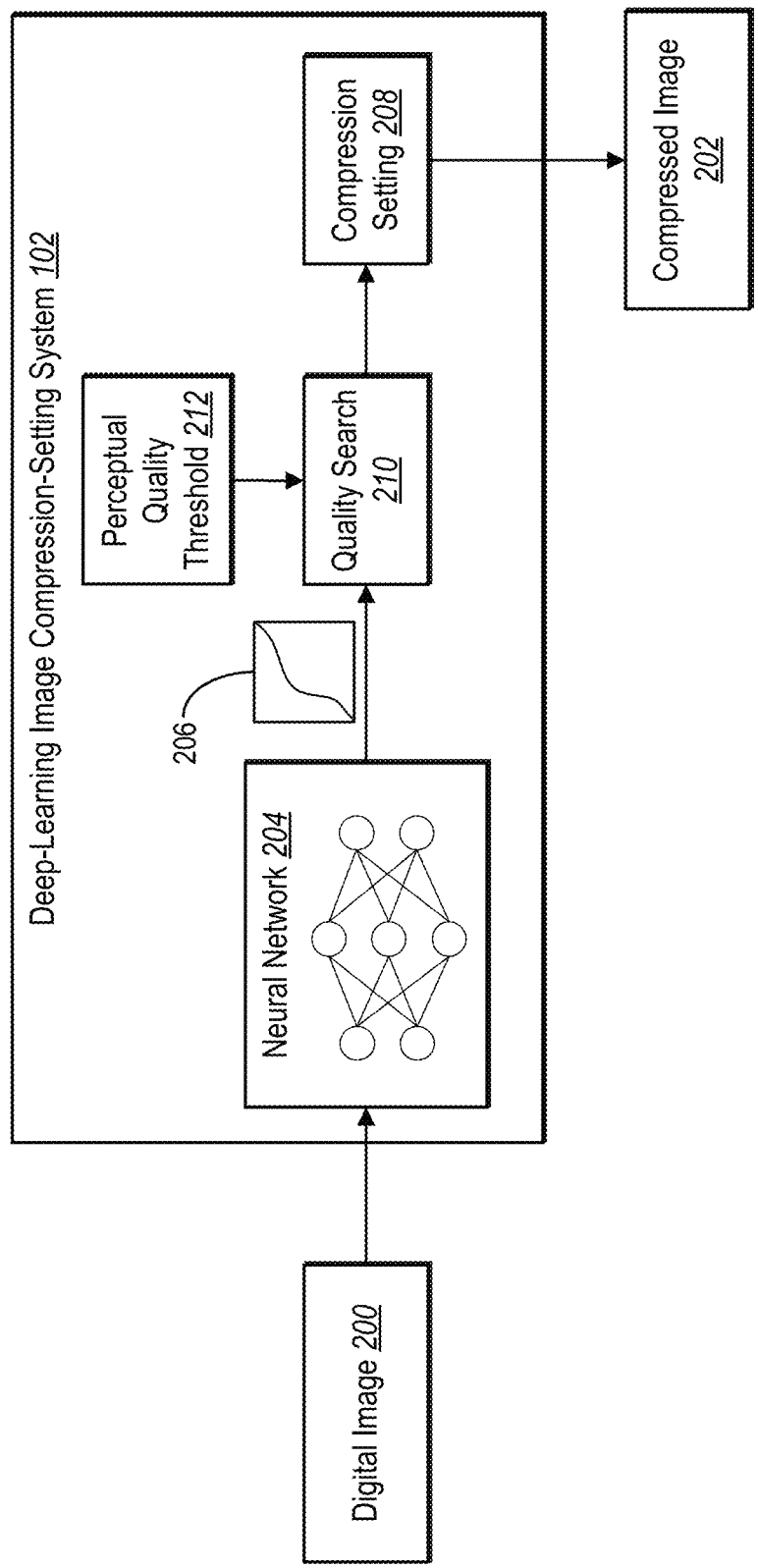
FIG. 2 illustrates a diagram of a process for intelligently selecting compression settings for compressing a digital image in accordance with one or more implementations.

As mentioned above, the deep-learning image compression-setting system 102 efficiently and flexibly determines compression settings for compressing digital images. FIG. 2 illustrates an overview of a process for utilizing a neural network to automatically determine a compression setting based on perceptual characteristics of a digital image. FIG. 2 also illustrates utilizing the determined compression setting to automatically compress the digital image. By automatically determining compression settings and then compressing digital images, the deep-learning image compression-setting system 102 simplifies a process for compressing digital images in a manner that improves the speed and usability of computing devices that compress digital images.

As illustrated in FIG. 2, the deep-learning image compression-setting system 102 processes a digital image 200 to generate a compressed image 202. In one or more embodiments, the deep-learning image compression-setting system 102 begins a process of compressing the digital image 200 by utilizing a neural network 204 to generate points indicating predicted compression distortions for a plurality of possible compressed versions of the digital image 200. For example, the deep-learning image compression-setting system 102 utilizes a compression algorithm to generate the compressed image 202. The deep-learning image compression-setting system 102 utilizes the neural network 204 to generate the points according to a compression quality scale associated with the compression algorithm. In one or more embodiments, the neural network 204 generates predicted Haar-PSI values for possible compressed images associated with various compression settings along the compression quality scale.

FIG. 2 illustrates that the deep-learning image compression-setting system 102 further utilizes the points generated by the neural network 204 to determine a perceptual distortion characteristic curve 206 for the digital image 200. In one or more embodiments, the deep-learning image compression-setting system 102 generates the perceptual distortion characteristic curve 206 by fitting a curve to the generated points. Specifically, the deep-learning image compression-setting system 102 fits a curve to the points to generate a smooth, continuous function along the compression quality scale.

After determining the perceptual distortion characteristic curve 206, the deep-learning image compression-setting system 102 interpolates the curve at additional points along the compression quality scale. Specifically, while the neural network 204 generates points for a subset of possible compressed versions (e.g., corresponding to a subset of compression settings on the compression quality scale), the deep-learning image compression-setting system 102 utilizes the perceptual distortion characteristic curve 206 to determine points at the remaining possible compressed versions. Thus, in some embodiments, the deep-learning image compression-setting system 102 utilizes the neural network 204 and the perceptual distortion characteristic curve 206 to determine predicted compression distortions for all possible compression settings within the compression quality scale.

FIG. 2 further illustrates that the deep-learning image compression-setting system 102 utilizes the perceptual distortion characteristic curve 206 to select a compression setting 208 for generating the compressed image 202. In one or more embodiments, the deep-learning image compression-setting system 102 applies a quality search 210 to the perceptual distortion characteristic curve 206 to select the compression setting 208. For instance, the quality search 210 includes a bisection search that searches over a plurality of possible compression settings (e.g., in a compression quality scale) to determine the compression setting 208 to use in compressing the digital image 200.

According to some embodiments, the deep-learning image compression-setting system 102 utilizes the quality search 210 to select the compression setting 208 based on a perceptual quality threshold 212. Specifically, the perceptual quality threshold 212 includes a threshold value of perceptual quality (e.g., 0.98 Haar-PSI value) for generating the compressed image 202. For example, the deep-learning image compression-setting system 102 utilizes the quality search 210 to determine a compression setting that meets the perceptual quality threshold 212. To illustrate, the deep-learning image compression-setting system 102 selects a compression setting comprising a predicted perceptual quality that meets the perceptual quality threshold 212 based on the predicted compression distortion associated with the compression setting. In one or more embodiments, the deep-learning image compression-setting system 102 utilizes the quality search 210 to determine a lowest compression setting associated with a predicted perceptual quality that meets the perceptual quality threshold 212.

After selecting the compression setting 208 based on the quality search 210, the digital image compression system 110 utilizes the compression setting 208 to generate the compressed image 202. For example, the deep-learning image compression-setting system 102 determines compression parameters associated with the compression setting 208. The digital image compression system 110 then utilizes a compression algorithm (e.g., a JPEG or WebP compression algorithm) to apply the compression parameters associated with the compression setting 208 to generate the compressed image 202. By applying compression parameters associated with an intelligently selected compression setting and according to a threshold perceptual quality, the digital image compression system 110 generates the compressed image 202 to have an optimal balance between perceptual quality and compression amount.

Figure 3A:
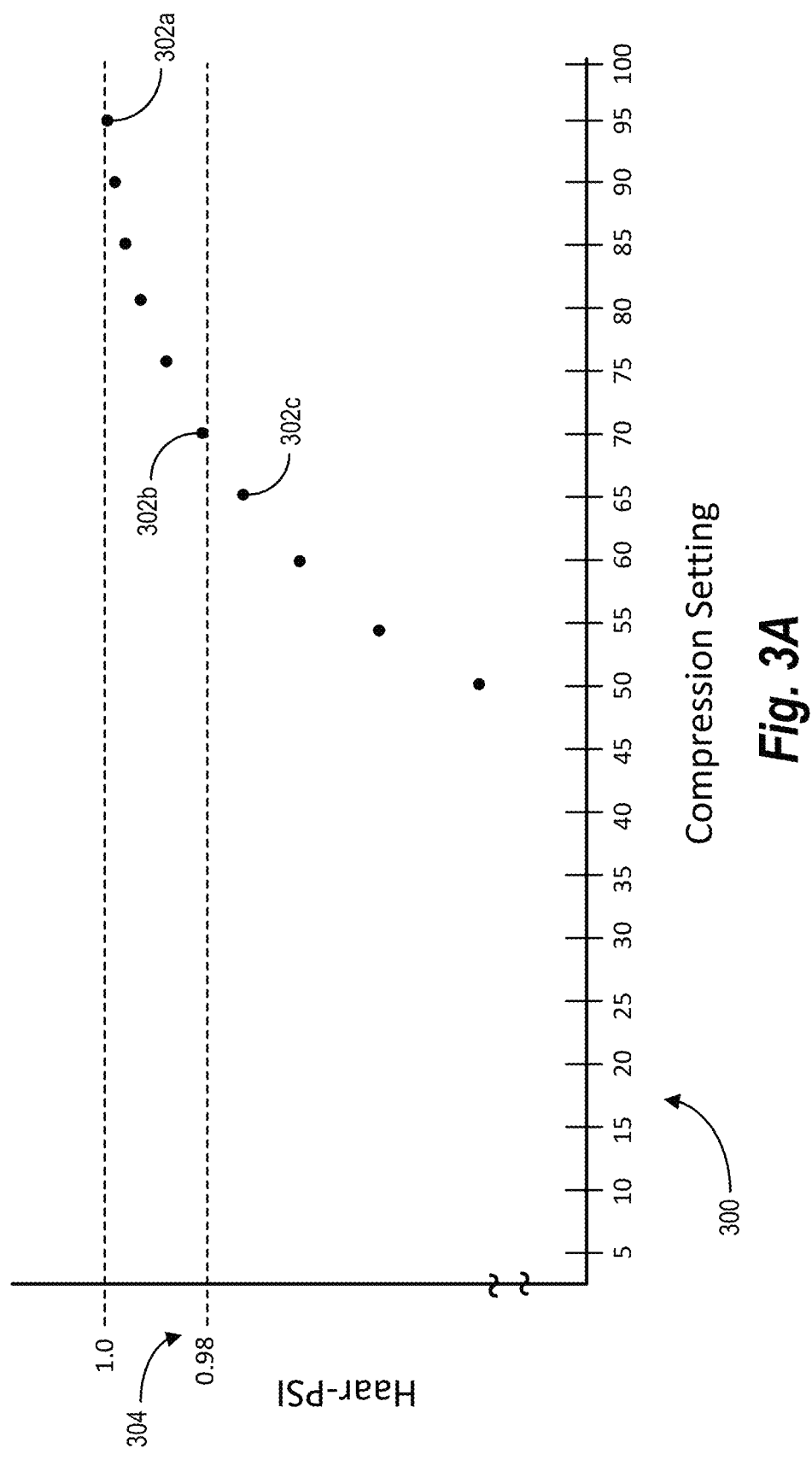
FIGS. 3A-3B illustrate predicted compression distortions and a perceptual distortion characteristic curve associated with a digital image in accordance with one or more implementations.

As mentioned, the deep-learning image compression-setting system 102 utilizes a neural network to generate predicted compression distortions for a plurality of possible compressed versions of a digital image. In particular, the deep-learning image compression-setting system 102 processes a digital image utilizing the neural network to predict differences in perceptual quality between various levels of compression of the digital image. FIG. 3A illustrates a plurality of points indicating predicted compression distortions corresponding to a plurality of possible compressed versions of a digital image. In particular, in one or more embodiments, the plurality of points indicates predicted compression distortions corresponding to specific compression settings within a compression quality scale. Thus, the possible compressed versions include versions of the digital image that the deep-learning image compression-setting system 102 has not generated for the digital image.

In one or more embodiments, the deep-learning image compression-setting system 102 utilizes the neural network to generate a plurality of points that are equidistant along a compression quality scale 300. As mentioned, a compression quality scale can include a plurality of values indicating different compression settings, each with different compression parameters that result in a range of compression amount applied to a digital image when compressing the image. Accordingly, each point corresponds to a possible compressed version of the digital image based on the corresponding compression settings. FIG. 3A illustrates that the compression quality scale 300 includes compression setting values (e.g., from 1-100) along the x-axis relative to perceptual quality values (e.g., Haar-PSI values) along the y-axis.

FIG. 3A illustrates that the deep-learning image compression-setting system 102 utilizes the neural network to generate points that are space apart equally along the compression quality scale 300. For example, the deep-learning image compression-setting system 102 generates 19 equidistant points along the compression quality scale 300. To illustrate, the neural network generates points that are separated by a predetermined value (based on the number of points) of 5 compression setting values, resulting in generated points for compression setting values of [5, 10, 15, . . . , 90, 95]. FIG. 3A illustrates a truncated graph including generated points along the compression quality scale 300 such that FIG. 3A shows only a subset of the generated points.

As shown in FIG. 3A, a first point 302a generated by the neural network corresponds to a compression setting value of 95. Additionally, the first point 302a includes a predicted Haar-PSI value of approximately 0.997. FIG. 3A illustrates that the neural network generates a plurality of points for a plurality of additional compression setting values with Haar-PSI values less than the first point 302. Specifically, as shown, the Haar-PSI values continually decrease as the compression settings values also decrease. Furthermore, FIG. 3A illustrates that the Haar-PSI values decrease more rapidly with lower compression settings values, indicating that significant visual details are lost at specific compression settings.

As mentioned, in one or more embodiments, the deep-learning image compression-setting system 102 utilizes a perceptual quality threshold to determine optimal compression parameters for compressing a digital image. FIG. 3A illustrates a perceptual quality threshold 304 indicating a threshold Haar-PSI value along the y-axis. For example, the deep-learning image compression-setting system 102 determines the threshold Haar-PSI value as 0.98. In alternative embodiments, the deep-learning image compression-setting system 102 determines a perceptual quality threshold as a different perceptual quality value (e.g., above or below 0.98), as may serve a particular embodiment. For instance, the deep-learning image compression-setting system 102 determines the perceptual quality threshold based on a resolution of a display device or based on a particular usage of a compressed image.

As shown, the generated points corresponding to the different compression settings values have perceptual quality values above or below the perceptual quality threshold 304. To illustrate, the first point 302a including a predicted Haar-PSI value of 0.997 is above the perceptual quality threshold 304. Additionally, FIG. 3A illustrates that a second point 302b corresponding to a compression setting of 70 includes a predicted Haar-PSI value of 0.985. Furthermore, FIG. 3A illustrates that a third point 302c corresponding to a compression setting of 65 includes a predicted Haar-PSI value of 0.977. Accordingly, in the embodiment of FIG. 3A, the perceptual quality threshold 304 falls between the second point 302b and the third point 302c.

Figure 3B:
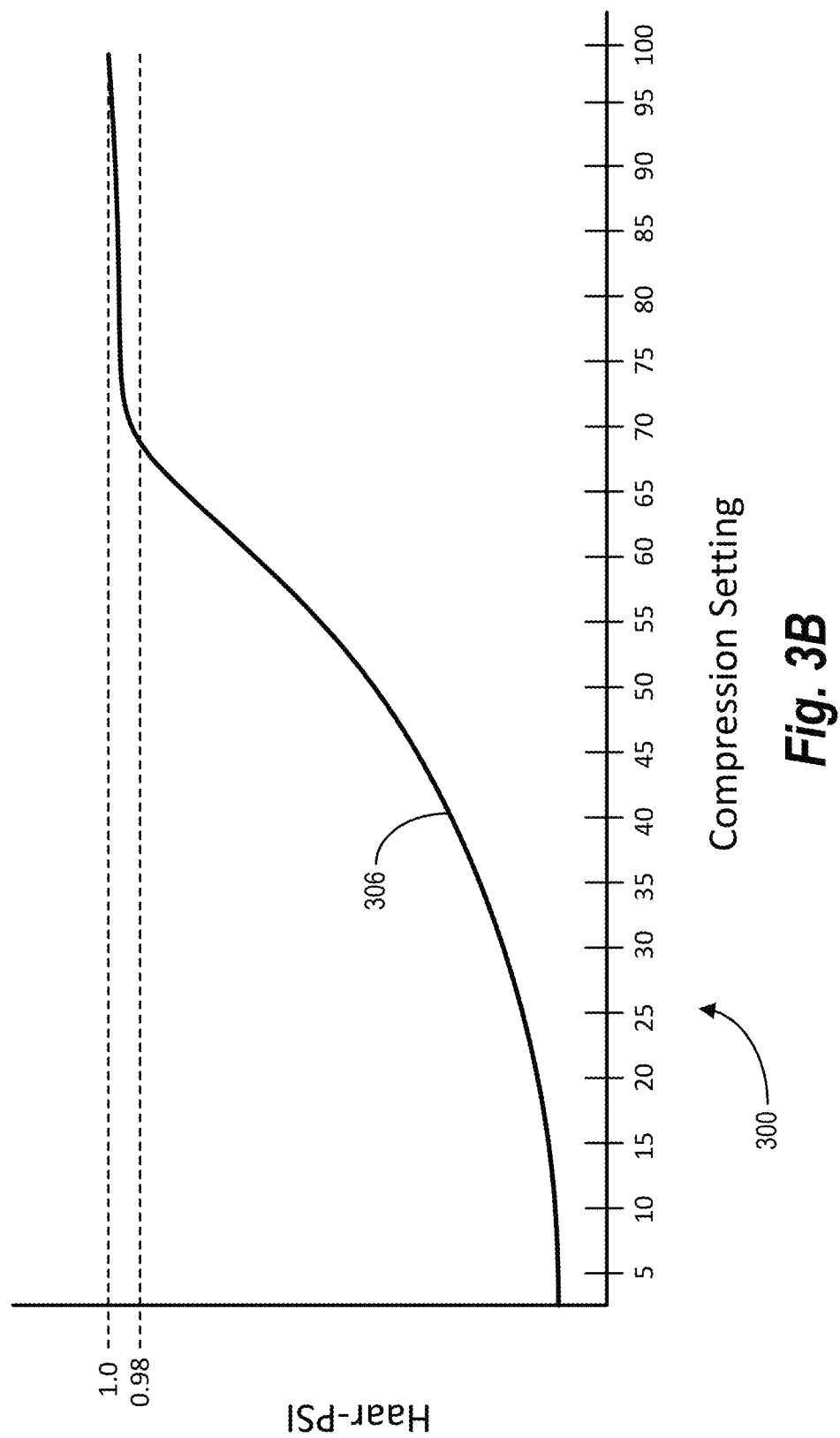

To select a compression setting for generating a compressed image, the deep-learning image compression-setting system 102 extrapolates the points to the remaining compression settings along the compression quality scale 300. FIG. 3B illustrates that the deep-learning image compression-setting system 102 fits a perceptual distortion characteristic curve 306 to the plurality of points. In one or more embodiments, the deep-learning image compression-setting system 102 utilizes a curve fitting algorithm to determine a polynomial function that best fits the plurality of points. For instance, the deep-learning image compression-setting system 102 determines the perceptual distortion characteristic curve 306 as a smooth fifth-degree polynomial that fits the plurality of points. In alternative embodiments, the deep-learning image compression-setting system 102 determines one or more curves of any degree that fit to the plurality of points.

By fitting the perceptual distortion characteristic curve 306 to the plurality of points, the deep-learning image compression-setting system 102 provides a function that covers an entire range of values on the compression quality scale 300. Additionally, the deep-learning image compression-setting system 102 utilizes the perceptual distortion characteristic curve 306 to determine a plurality of additional points indicating predicted compression distortions for additional possible compressed versions of a digital image. For instance, the deep-learning image compression-setting system 102 interpolates the perceptual distortion characteristic curve 306 at the remaining compression settings such that the deep-learning image compression-setting system 102 determines a point indicating predicted compression distortions for each of the possible compressed versions relative to the original digital image. To illustrate, in the embodiment of FIG. 3B, the deep-learning image compression-setting system 102 interpolates at a plurality of compression setting values between each point generated by the neural network by utilizing the perceptual distortion characteristic curve 306 to determine the predicted Haar-PSI values for a plurality of additional compression setting values. Thus, the deep-learning image compression-setting system 102 interpolates at compression setting values from 1 to 4, from 6 to 9, from 11 to 14, etc., until the deep-learning image compression-setting system 102 has interpolated the perceptual distortion characteristic curve 306 at each of the remaining compression setting values.

By generating predictions for a subset of possible compression setting values utilizing the neural network and then using curve-fitting and interpolation to determine the predictions for the remaining values, the deep-learning image compression-setting system 102 efficiently and accurately generates predictions for the compression setting values along the compression quality scale 300. In one or more alternative embodiments, the deep-learning image compression-setting system 102 generates more or fewer points indicating predicted compression distortions utilizing the neural network. Additionally, in one or more embodiments, the deep-learning image compression-setting system 102 interpolates the perceptual distortion characteristic curve 306 at a second subset of compression settings values (e.g., without interpolating at all possible remaining values). Thus, the deep-learning image compression-setting system 102 can utilize any combination of neural network predictions and interpolated predictions to generate any number of predicted compression distortions depending on the compression quality scale, the digital image, and/or the need for accuracy/compression size balance.

Figure 4:
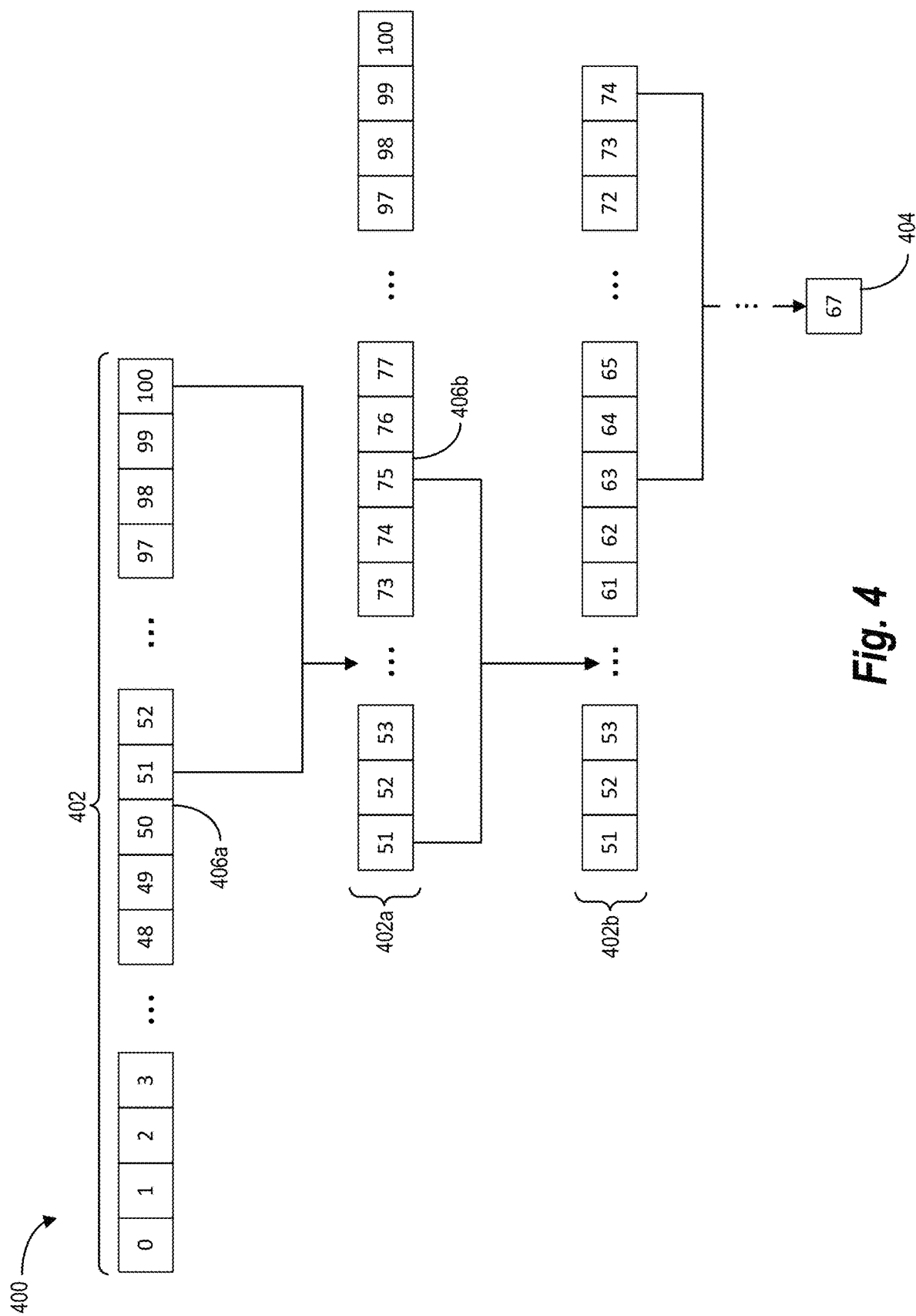
FIG. 4 illustrates a bisection search over compression settings within a compression setting scale in accordance with one or more implementations.

After interpolating the perceptual distortion characteristic curve 306 at the remaining compression setting values, the deep-learning image compression-setting system 102 performs a search over the values. For example, FIG. 4 illustrates an example of a bisection search 400 over a plurality of compression settings 402 in a compression quality scale. Specifically, as illustrated, FIG. 4 shows that the deep-learning image compression-setting system 102 performs a plurality of search iterations in the bisection search 400 to select a compression setting 404 to use in compressing a digital image.

FIG. 4 illustrates that the deep-learning image compression-setting system 102 performs a first search over the plurality of compression settings 402. In one or more embodiments, the deep-learning image compression-setting system 102 divides the plurality of compression settings 402 in half (or approximately in half) to select a compression setting for testing. For example, the deep-learning image compression-setting system 102 selects a first compression setting 406a at a halfway point within the compression quality scale. The deep-learning image compression-setting system 102 then compares a predicted perceptual quality value (e.g., a predicted Haar-PSI value) associated with the first compression setting 406a to a perceptual quality threshold.

After comparing the predicted perceptual quality value of the first compression setting 406a to the perceptual quality threshold, the deep-learning image compression-setting system 102 selects a first subset 402a of the plurality of compression settings 402 to perform a second stage of the bisection search 400. For example, the deep-learning image compression-setting system 102 selects the first subset 402a in response to determining that the predicted perceptual quality value of the first compression setting 406a does not meet the perceptual quality threshold (i.e., the predicted perceptual quality value is below the perceptual quality threshold). In such embodiments, the first subset 402a includes compression settings in an upper half of the compression quality scale (e.g., between the first compression setting 406a and a compression setting at an upper end of the compression quality scale. Alternatively, if the predicted perceptual quality value of the first compression setting 406a meets the perceptual quality threshold, the deep-learning image compression-setting system 102 selects the first subset as a plurality of values in a lower half of the compression quality scale.

In the second stage of the bisection search 400, the deep-learning image compression-setting system selects a second compression setting 406b by bisecting the first subset 402a. The deep-learning image compression-setting system 102 then compares the predicted compression quality value of the second compression setting 406b to the perceptual quality threshold. In response to determining that the predicted compression quality value of the second compression setting 406b meets the perceptual quality threshold, the deep-learning image compression-setting system 102 selects a second subset 402b from the first subset 402. In particular, the second subset 402b includes compression settings between the first compression setting 406a and the second compression setting 406b.

As illustrated in FIG. 4, the deep-learning image compression-setting system 102 performs additional search stages to compare predicted perceptual values of additional compression settings to the perceptual quality threshold. In particular, the deep-learning image compression-setting system 102 iteratively bisects the plurality of compression settings 402 until identifying the compression setting 404. In one or more embodiments, the deep-learning image compression-setting system 102 selects the compression setting 404 to use for generating a compressed image in response to determining the lowest compression setting comprising a predicted perceptual quality that meets the perceptual quality threshold. In alternative embodiments, the deep-learning image compression-setting system 102 selects a compression setting in response to identifying a compression setting comprising a predicted perceptual quality that meets the perceptual quality threshold after performing a predetermined number of search stages.

In one or more embodiments, the deep-learning image compression-setting system 102 utilizes the compression setting 404 to compress a digital image. Specifically, the deep-learning image compression-setting system 102 determines compression parameters associated with the compression setting 404. For example, in various embodiments, a compression setting 404 includes a compression ratio for generating a compressed image. To illustrate, a compression ratio can include a ratio between a compressed image at highest quality (e.g., 100) and a selected quality (e.g., 67 in connection with the compression setting 404). More specifically, the deep-learning image compression-setting system 102 determines the compression quality for a particular image at the rendered size of the image (e.g., without zooming in).

In one or more embodiments, determining a compression ratio involves the deep-learning image compression-setting system 102 first decoding a digital image to a pixelmap. The deep-learning image compression-setting system 102 then encodes the pixelmap at the highest compression quality to obtain a first compressed image with image size $S_o$ (e.g., in bytes). The deep-learning image compression-setting system 102 also encodes the pixelmap at the selected compression setting to obtain a second compressed image with image size $S_c$. The deep-learning image compression-setting system 102 determines the compression ratio by comparing the sizes of the compressed images as $S_o/S_c$. By determining a compression ratio in such a manner, the deep-learning image compression-setting system 102 prevents discrepancies with sizes caused by metadata or encoding engine efficiencies/deficiencies.

As previously mentioned, the deep-learning image compression-setting system 102 utilizes a neural network to generate points indicating predicted compression distortion for possible compressed versions of a digital image. Specifically, in one or more embodiments, the neural network generates predicted perceptual quality values (e.g., Haar-PSI values) based on an amount of distortion between a digital image a compressed image generated using specific compression settings. Accordingly, the deep-learning image compression-setting system 102 utilizes the neural network to predict perceptual qualities of compression settings based on compressed versions of a digital image that have not been generated.

As described in relation to FIGS. 2 and 3A-3B, the deep-learning image compression-setting system 102 performs operations for intelligently selecting compression settings for generating compressed digital images. The operations allow the deep-learning image compression-setting system 102 to more efficiently and flexibly compress digital images based on the content of the digital images. Accordingly, the acts and operations illustrated and described above in relation to FIGS. 2 and 3A-3B can provide the corresponding acts (e.g., structure) for a step for determining a perceptual distortion characteristic curve for compressing a digital image.

By intelligently selecting compression settings utilizing a neural network, the deep-learning image compression-setting system 102 provide dynamic image compression based on the contents of digital images. Specifically, compressing digital images at similar compressing settings can result in very different perceptual distortions. For example, digital images with high frequency data (e.g., images with mean pixel values changing rapidly over space) such as photographs or images with complex objects and color transitions can typically be compressed at lower compression settings with minimal distortion. In contrast, digital images with low frequency data (e.g., images with mean pixel values changing slowly over space) such as vector graphics or other low detail images can experience significant perceptual distortion at lower compression settings. Thus, the deep-learning image compression-setting system 102 dynamically determines the optimal compression settings for each image based on the point at which the perceptual quality of each image deteriorates below a threshold amount.

Figures 5A, 5B:
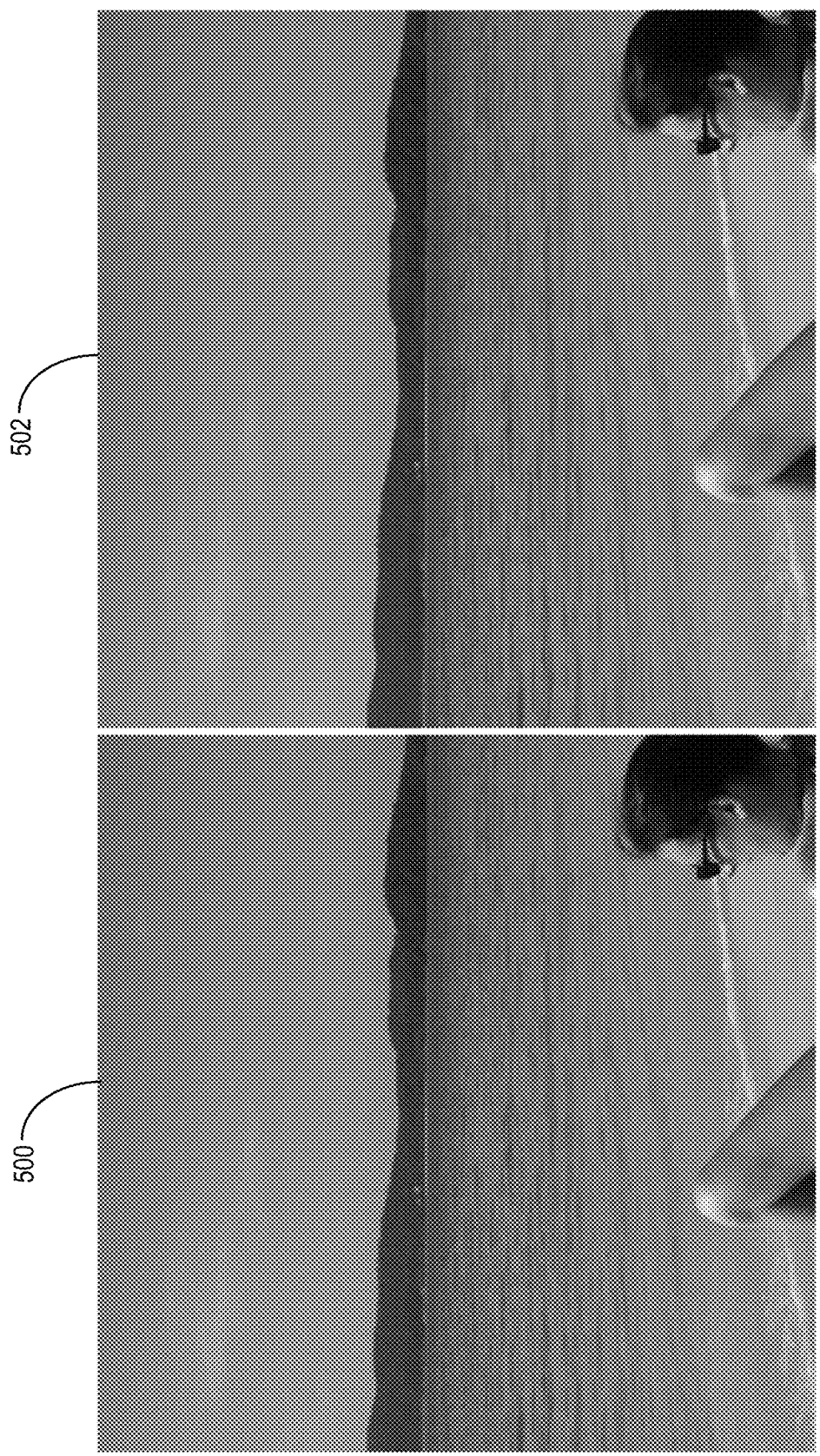
FIGS. 5A-5B and 6A-6B illustrate image pairs comprising an uncompressed digital image and a corresponding compressed digital image in accordance with one or more implementations.

For example, FIGS. 5A-5B and 6A-6B illustrate digital images that the deep-learning image compression-setting system 102 compresses utilizing a neural network to select the compression settings. In particular, FIG. 5A illustrates a first digital image 500 including a photograph with high frequency data. FIG. 5B illustrates a first compressed image 502 based on a compression setting selected utilizing the neural network. The file size of the first digital image 500 is 61 kilobytes, and the file size of the first compressed image 502 is 29 kilobytes, resulting in a significant decrease in file size while maintaining similar perceptual similarity.

Figures 6A, 6B:
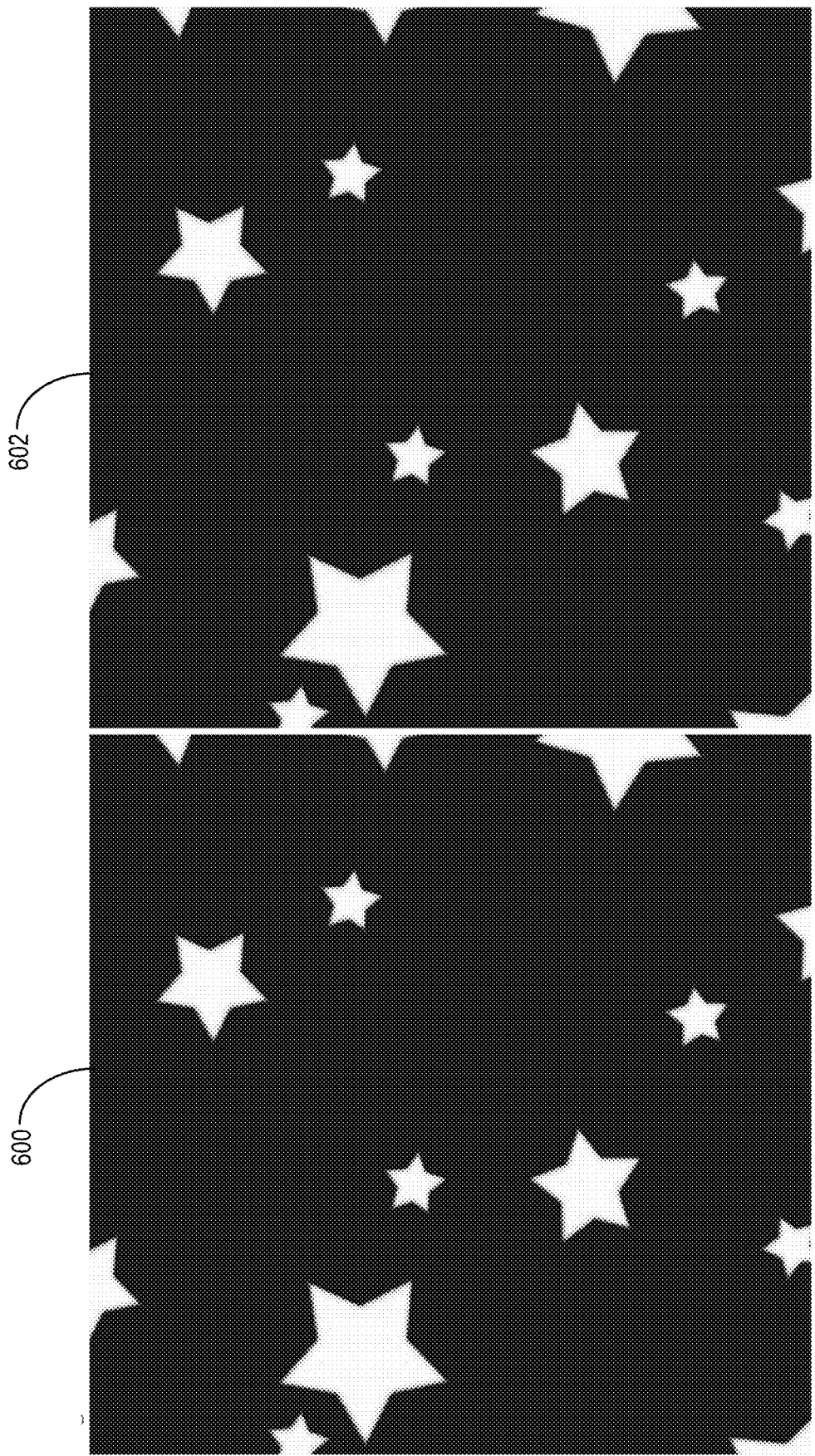

FIG. 6A illustrates a second digital image 600 including a vector graphic with low frequency data. FIG. 6B illustrates a second compressed image 602 based on a compression setting selected utilizing the neural network. The file size of the second digital image 600 is 26 kilobytes, and the file size of the second compressed image 602 is 25 kilobytes, resulting in minimal decrease in file size to maintain similar perceptual similarity. Because the second digital image 600 includes a vector graphic with few visual details, higher amounts of compression (i.e., lower compression settings) would have resulted in a significant perceptual difference between the second digital image 600 and the compressed image. Thus, the deep-learning image compression-setting system 102 automatically compresses the second digital image 600 with a higher compression setting to preserve perceptual similarity in the second compressed image 602.

Figure 7A:
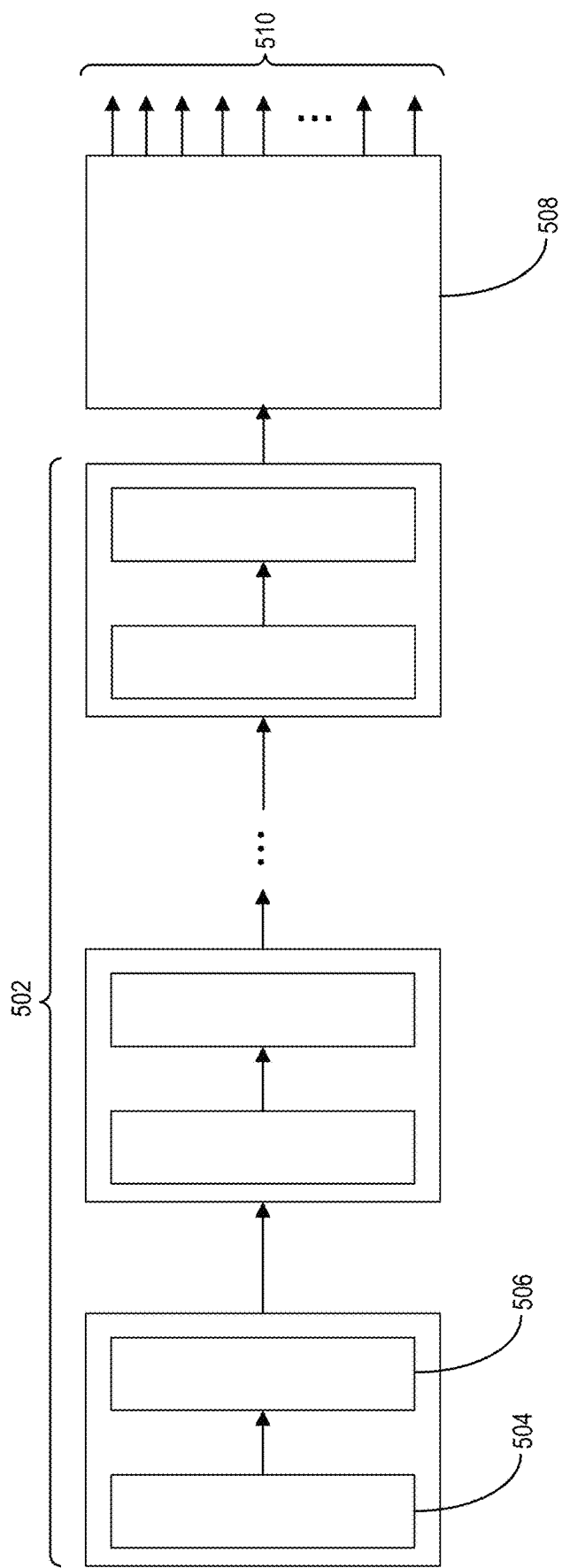
FIG. 7A illustrates a diagram of a neural network for generating predicted compression distortion points for possible compressed versions of a digital image in accordance with one or more implementations.

FIG. 7A illustrates an embodiment of a network architecture for a neural network 700 that generates points indicating predicted compression distortions for possible compressed versions of a digital image relative to an uncompressed version of the digital image. Specifically, the neural network 700 includes a plurality of blocks 702 of convolutional layers. For example, each of the blocks 702 includes a stride-2 convolutional layer 704 followed by a stride-1 convolutional layer with rectified linear unit activation. In one or more embodiments, the neural network 700 includes eight blocks of convolutional layers.

Additionally, FIG. 7A illustrates that the neural network 700 is not a fully connected neural network. Furthermore, each block of convolutional layers processes pixels of digital images via a stride-2 convolutional layer and a stride-1 convolutional layer. In particular, by skipping over pixels in a digital image while processing the digital image, the neural network 700 provides fast and efficient image processing.

Additionally, FIG. 7A illustrates that the neural network 700 includes a final convolutional layer 708 after the plurality of blocks 702. Specifically, the neural network 700 utilizes the final convolutional layer 708 to generate a plurality of points indicating predicted compression distortions. According to one or more embodiments, the final convolutional layer 708 includes sigmoid activation with a plurality of channels 710 that correspond to the compression settings for which the neural network generates the plurality of points. For instance, for an embodiment in which the deep-learning image compression-setting system 102 generates a vector of 19 points for compression settings equidistant along a compression quality scale, the final convolutional layer 708 includes 19 separate channels corresponding to the specific compression settings.

Figure 7B:
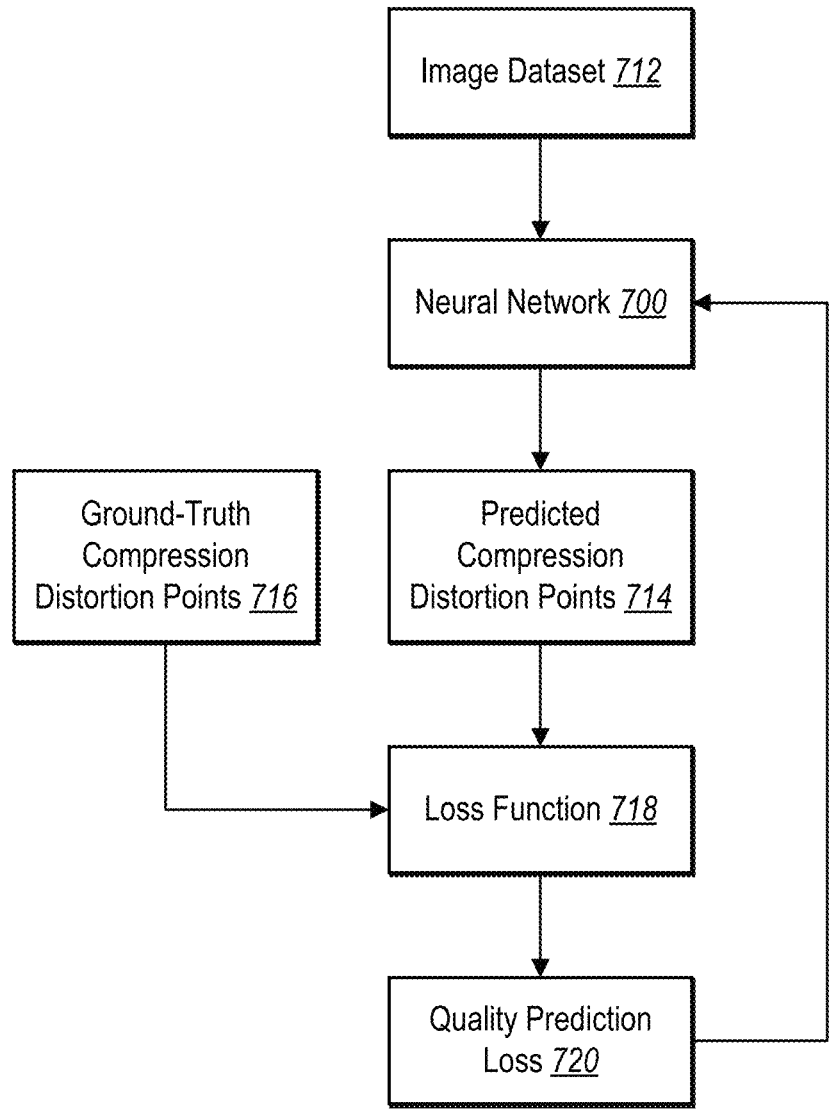
FIG. 7B illustrates a diagram of a sequence-flow diagram for learning parameters of a neural network using a quality loss prediction in accordance with one or more implementations.

Furthermore, in one or more embodiments, the deep-learning image compression-setting system 102 trains the neural network 700 to generate points indicating predicted compression distortion for a plurality of compression settings. FIG. 7B illustrates the deep-learning image compression-setting system 102 learning parameters of the neural network 700 for use in automatically selecting compression settings in connection with compressing digital images. For instance, as shown, in FIG. 7B, the deep-learning image compression-setting system 102 utilizing an image dataset 712 including a plurality of digital images. In one or more embodiments, the image dataset 712 includes a plurality of center-cropped images. Furthermore, in some embodiments, the center-cropped images have a single image resolution (e.g., 512×512 pixels).

FIG. 7B illustrates that the deep-learning image compression-setting system 102 utilizes the neural network 700 to generate predicted compression distortion points 714 for the digital images in the image dataset 712. Specifically, as previously described, the deep-learning image compression-setting system 102 utilizes the neural network 700 to generate the predicted compression distortion points 714 for equidistant compression settings within a compression quality scale. To illustrate, the neural network 700 generates a predicted compression distortion point for a subset of compression settings to indicate an amount of predicted compression distortion associated with a possible compressed version of a digital image in the image dataset 712.

After generating the predicted compression distortion points 714 for a digital image in the image dataset 712, the deep-learning image compression-setting system 102 compares the predicted compression distortion points 714 to ground-truth compression distortion points 716 from the image dataset 712. For example, the deep-learning image compression-setting system 102 utilizes a loss function 718 to determine differences between the predicted compression distortion points 714 and the ground-truth compression distortion points 716 to determine a quality prediction loss 720. The deep-learning image compression-setting system 102 thus utilizes the loss function 718 to determine a quality prediction loss 720 for each digital image in the image dataset 712.

In one or more embodiments, the loss function 718 includes an L1 loss regression function for minimizing error as a sum of absolute differences between the predicted compression distortion points 714 and the ground-truth compression distortion points 716. Accordingly, the quality prediction loss 720 represents a combined loss for the neural network 700 based on the predicted compression distortion points 714. For example, the deep-learning image compression-setting system 102 determines the quality prediction loss 720 for each digital image. Additionally, in some embodiments, the deep-learning image compression-setting system 102 determines a total quality prediction loss 720 for all images in the image dataset 712.

In one or more additional embodiments, the deep-learning image compression-setting system 102 trains the neural network 700 utilizing the quality prediction loss 720. For instance, the deep-learning image compression-setting system 102 utilizes the quality prediction loss 720 to learn parameters of the neural network 700 over a plurality of training epochs. In one or more embodiments, the deep-learning image compression-setting system 102 utilizes the L1 loss regression in 180 epochs for the image dataset 712 with mean test saturation at approximately 0.4-0.5. In some embodiments, the deep-learning image compression-setting system 102 also utilizes an Adam optimization algorithm for learning parameters of the neural network 700, as described by Diederik P. Kingma and Jimmy Ba in "Adam: A Method for Stochastic Optimization," in 3rd International Conference for Learning Representations, San Diego (2015), which is hereby incorporated by reference in its entirety.

In one or more embodiments, by selecting a perceptual quality threshold of 0.98 Haar-PSI value, the deep-learning image compression-setting system 102 utilizes the neural network 700 to obtain the following compression ratio statistics for WebP compression:

| N | Min | Max | Median | Avg | Stddev |
|---|---|---|---|---|---|
| 4000 | 1.5291468 | 10.806356 | 2.4682446 | 2.6082661 | 0.69726557 | and for JPEG compression:

| N | Min | Max | Median | Avg | Stddev |
|---|---|---|---|---|---|
| 2000 | 0.96001002 | 3.9284358 | 1.5510804 | 1.6680828 | 0.49697359 |

Furthermore, the deep-learning image compression-setting system 102 resulted in the following performance characteristics (CPU execution time (sections) per 512×512 image (neural network prediction time+curve fit+search time)) utilizing a neural network with size 864 kilobytes (the same size for both JPEG and WebP compression):

| N | Min | Max | Median | Avg | Stddev |
|---|---|---|---|---|---|
| 1006 | 0.032813549 | 0.063949823 | 0.036268473 | 0.036602991 | 0.0019248604 |

Thus, the deep-learning image compression-setting system 102 utilizes a fast, lightweight neural network that provides high quality compressed images while optimizing the storage sizes of compressed images.

Figure 8:
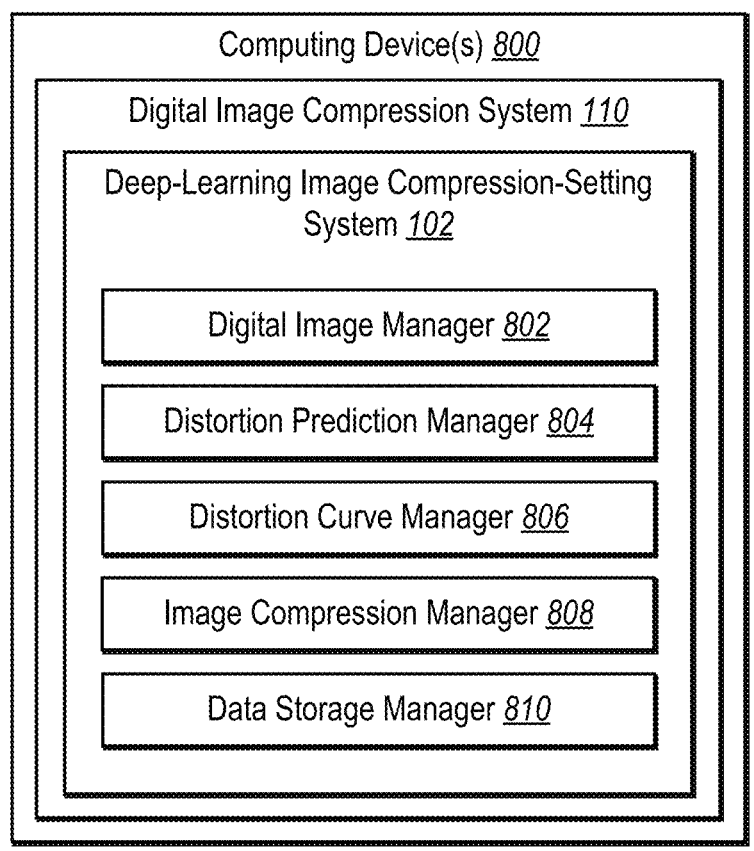
FIG. 8 illustrates a diagram of the deep-learning image compression-setting system of FIG. 1 in accordance with one or more implementations.

FIG. 8 illustrates a detailed schematic diagram of an embodiment of the deep-learning image compression-setting system 102 described above. As shown, the deep-learning image compression-setting system 102 is implemented in the digital image compression system 110 on computing device(s) 800 (e.g., a client device and/or server device as described in FIG. 1, and as further described below in relation to FIG. 10). Additionally, in one or more embodiments, the deep-learning image compression-setting system 102 includes, but is not limited to, a digital image manager 802, a distortion prediction manager 804, a distortion curve manager 806, an image compression manager 808, and a data storage manager 810. The deep-learning image compression-setting system 102 can be implemented on any number of computing devices. For example, in some embodiments, the deep-learning image compression-setting system 102 is implemented in a distributed system of server devices for managing digital content. In additional embodiments, the deep-learning image compression-setting system 102 is implemented within one or more additional systems. In alternative embodiments, the deep-learning image compression-setting system 102 is implemented on a single computing device such as a single client device.

In one or more embodiments, each of the components of the deep-learning image compression-setting system 102 is in communication with other components using any suitable communication technologies. Additionally, in some embodiments, the components of the deep-learning image compression-setting system 102 are in communication with one or more other devices including other computing devices of a user, server devices (e.g., cloud storage devices), licensing servers, or other devices/systems. It will be recognized that although the components of the deep-learning image compression-setting system 102 are shown to be separate in FIG. 8, in one or more embodiments, one or more of the sub-components are combined into fewer components, such as into a single component, or divided into more components as may serve a particular implementation. Furthermore, although the components of FIG. 8 are described in connection with the deep-learning image compression-setting system 102, in alternative embodiments, at least some of the components for performing operations in conjunction with the deep-learning image compression-setting system 102 described herein are implemented on other devices within the environment.

The components of the deep-learning image compression-setting system 102 can include software, hardware, or both. For example, in one or more embodiments, the components of the deep-learning image compression-setting system 102 include one or more instructions stored on a computer-readable storage medium and executable by processors of one or more computing devices (e.g., the computing device(s) 800). When executed by the one or more processors, the computer-executable instructions of the deep-learning image compression-setting system 102 cause the computing device(s) 800 to perform the operations described herein. Alternatively, the components of the deep-learning image compression-setting system 102 include hardware, such as a special purpose processing device to perform a certain function or group of functions. Additionally, or alternatively, the components of the deep-learning image compression-setting system 102 include a combination of computer-executable instructions and hardware.

Furthermore, the components of the deep-learning image compression-setting system 102 performing the functions described herein with respect to the deep-learning image compression-setting system 102 may, for example, be implemented as part of a stand-alone application, as a module of an application, as a plug-in for applications, as a library function or functions that may be called by other applications, and/or as a cloud-computing model. Thus, the components of the deep-learning image compression-setting system 102 may be implemented as part of a stand-alone application on a personal computing device or a mobile device. In some embodiments, the components of the deep-learning image compression-setting system 102 are implemented in an application that provides digital design editing, including, but not limited to CREATIVE CLOUD® or ADOBE MARKETING CLOUD® software. "ADOBE," "CREATIVE CLOUD," and "ADOBE MARKETING CLOUD" are either registered trademarks or trademarks of Adobe Inc. in the United States and/or other countries.

FIG. 8 illustrates that the deep-learning image compression-setting system 102 includes a digital image manager 802. The digital image manager 802 manages digital images in connection with a digital image system (e.g., the digital image compression system 110 of FIG. 1). For example, the digital image manager 802 identifies digital images for image compression. In one or more embodiments, the digital image manager 802 also manages compressed images associated with the digital images.

In one or more embodiments, the deep-learning image compression-setting system 102 also includes a distortion prediction manager 804. For instance, the distortion prediction manager 804 utilizes a neural network to process digital images and generate a plurality of points indicating predicted perceptual distortions between digital images and possible compressed versions of the digital images. For example, the distortion prediction manager 804 generates predicted perceptual values (e.g., Haar-PSI values) for a plurality of compression settings within a compression quality scale.

Furthermore, FIG. 8 illustrates that the deep-learning image compression-setting system 102 includes a distortion curve manager 806. The distortion curve manager 806 determines a perceptual distortion characteristic curve based on points generated by a neural network, such as by fitting a curve to the plurality of generated points. For example, the distortion curve manager 806 generates the perceptual distortion characteristic curve for interpolating at a plurality of additional compression settings (e.g., remaining compression settings along the compression quality scale).

In one or more embodiments, the deep-learning image compression-setting system 102 includes an image compression manager 808 to select a compression setting and then generate a compressed image for a digital image. For instance, the image compression manager 808 performs a search over a plurality of compression settings to select a compression setting for which a Haar-PSI value meets a perceptual quality threshold. To illustrate, the image compression manager 808 utilizes a bisection search to determine a lowest compression setting that meets the threshold.

In additional embodiments, the image compression manager 808 also utilizes the selected compression setting to generate a compressed image for the digital image. For example, the image compression manager 808 determines compression parameters associated with the selected compression setting. The image compression manager 808 then applies the compression parameters to a compression algorithm (e.g., JPEG or WebP) to compress the digital image and generate the compressed digital image.

The deep-learning image compression-setting system 102 also includes a data storage manager 810 (that comprises a non-transitory computer memory/one or more memory devices) that stores and maintains data associated with digital images. For example, the data storage manager 810 stores image data and image metadata for a plurality of digital images. In one or more embodiments, the data storage manager 810 also stores data associated with compressing the digital images. To illustrate, the data storage manager 810 stores pixelmaps for digital images, perceptual distortion characteristic curves for digital images, selected compression settings, and compressed image data and metadata. In additional embodiments, the data storage manager 810 also stores a neural network for predicting points indicating predicted perceptual distortion associated with compressing digital images, as described previously.

Figure 9:
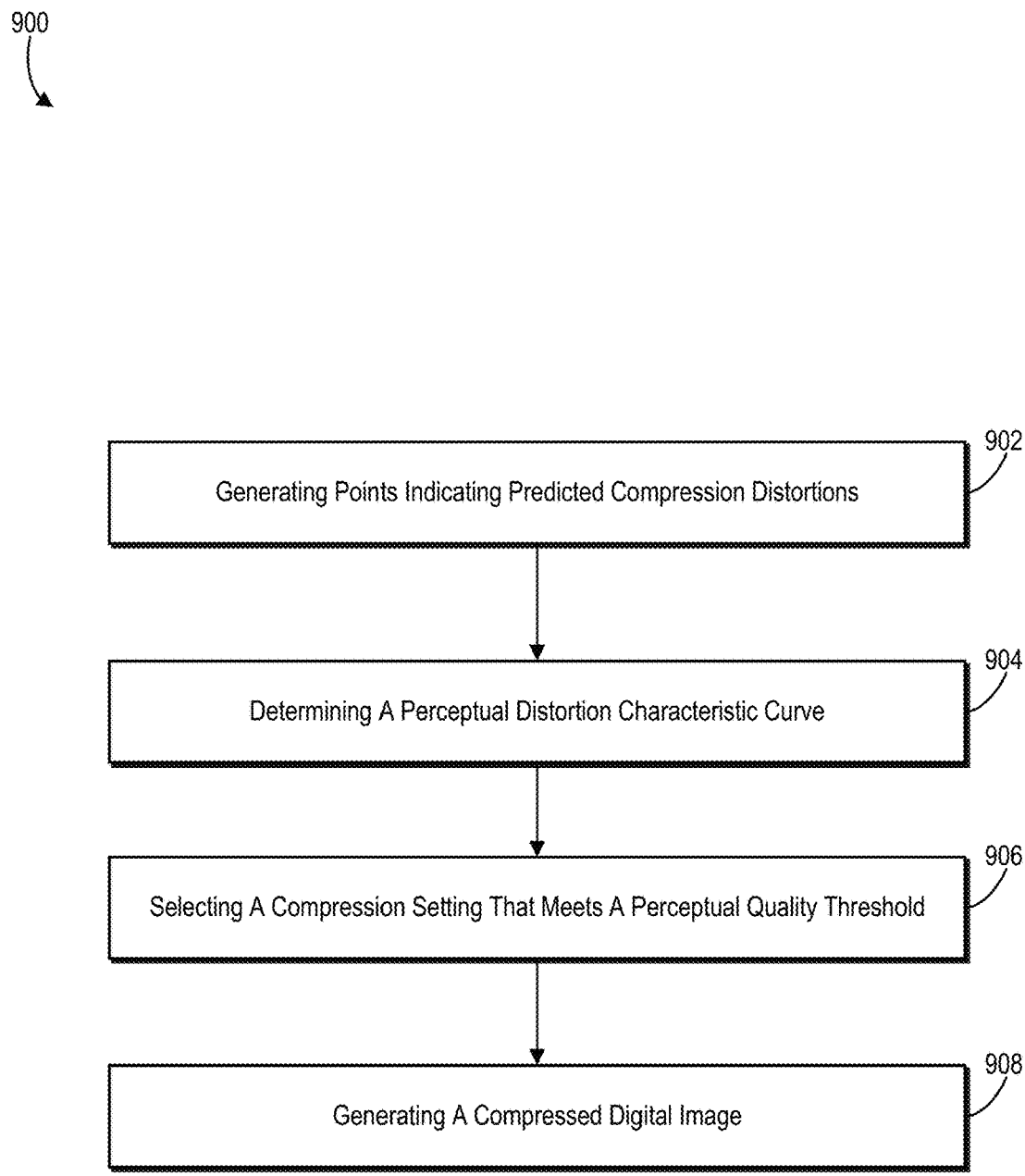
FIG. 9 illustrates a flowchart of a series of acts for compressing a digital image with intelligently selected compression settings utilizing a neural network in accordance with one or more implementations.

Turning now to FIG. 9, this figure shows a flowchart of a series of acts 900 of utilizing a neural network to select compression settings for compressing a digital image. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9.

As shown, the series of acts 900 includes an act 902 of generating points indicating predicted compression distortions. For example, act 902 involves generating, utilizing a neural network given an uncompressed digital image as input, a plurality of points indicating predicted compression distortions for a plurality of possible compressed versions of the uncompressed digital image. To illustrate, the plurality of points comprises a plurality of Haar wavelet-based perceptual similarity index values representing predicted perceptual similarities between the uncompressed digital image and the plurality of possible compressed versions of the uncompressed digital image.

In one or more embodiments, act 902 involves generating the plurality of points for a plurality of possible compressed versions corresponding to compression settings equidistant along a compression quality scale. Specifically, act 902 can involve generating the plurality of points for a plurality of possible compressed versions corresponding to compression settings spaced at intervals equal to a predetermined value along a compression quality scale.

For example, act 902 can involve generating, utilizing the neural network, a first point of the plurality of points to indicate a predicted perceptual similarity between the uncompressed digital image and a first possible compressed version of the uncompressed digital image corresponding to a first compression setting. Act 902 also involves generating, utilizing the neural network, a second point of the plurality of points to indicate a predicted perceptual similarity between the uncompressed digital image and a second possible compressed version of the uncompressed digital image corresponding to a second compression setting different than the first compression setting.

Additionally, act 902 can involve generating, for a possible compressed version of the plurality of possible compressed versions, a set of predicted points corresponding to a plurality of patches of the possible compressed version. Act 902 can then involve selecting, for the possible compressed version, a final predicted point from the set of predicted points. For example, act 902 can involve selecting a highest compression setting from the set of predicted points as the final predicted point.

Additionally, the series of acts 900 includes an act 904 of determining a perceptual distortion characteristic curve. For example, act 904 involves determining a perceptual distortion characteristic curve for the uncompressed digital image from the plurality of points generated by the neural network. In one or more embodiments, act 904 involves fitting a polynomial curve to the plurality of points. For instance, act 904 can involve fitting a multi-degree polynomial to the plurality of points, wherein the multi-degree polynomial comprises the plurality of points and a plurality of additional points indicating predicted compression distortions for a plurality of additional possible compressed versions of the uncompressed digital image corresponding to compression settings between the plurality of points. Act 904 then involves determining additional predicted compression distortions for a plurality of additional possible compressed versions by interpolating the polynomial curve across the compression quality scale. For example, act 904 can involve interpolating the perceptual distortion characteristic curve at a plurality of additional possible compression setting.

The series of acts 900 also includes an act 906 of selecting a compression setting that meets a perceptual quality threshold. For example, act 906 involves selecting, based on the perceptual distortion characteristic curve, a compression setting that meets a perceptual quality threshold. In one or more embodiments, act 906 involves performing a bisection search over compression settings within a compression setting scale to determine a lowest compression setting comprising a predicted perceptual quality that meets the perceptual quality threshold.

More specifically, act 906 can involve determining whether a predicted perceptual similarity value for a first possible compressed version associated with a first compression setting meets the perceptual quality threshold. Act 906 can then involve, in response to determining that the predicted perceptual similarity for the first possible compressed version meets the perceptual quality threshold, bisecting a plurality of remaining compression settings to identify a second possible compressed version associated with a second compression setting. Act 906 can further involve determining whether a predicted perceptual similarity value for the second possible compressed version associated with the second compression setting meets the perceptual quality threshold. Act 906 can also involve successively determining whether predicted perceptual similarity values for possible compressed versions meet the perceptual quality threshold in a bisection search to determine a lowest compression setting for which a predicted perceptual similarity value meets the perceptual quality threshold.

Furthermore, the series of acts 900 includes an act 908 of generating a compressed digital image. For example, act 908 involves generating a compressed digital image utilizing the selected compression setting that meets the perceptual quality threshold. For instance, act 908 can involve compressing the uncompressed digital image utilizing a plurality of compression parameters corresponding to a lowest compression setting comprising a predicted perceptual quality that meets the perceptual quality threshold.

In one or more embodiments, the series of acts 900 includes generating, utilizing the neural network, a plurality of predicted compression distortion points for a plurality of compressed versions of a digital image relative to an uncompressed version of the digital image. For example, the series of acts 900 then includes determining a quality prediction loss based on a difference between the plurality of predicted compression distortion points and a plurality of ground-truth compression distortion points for the plurality of compressed versions of the digital image. The series of acts 900 then includes learning the parameters of the neural network based on the quality prediction loss.

Additionally, in one or more embodiments, the neural network comprises a plurality of convolutional neural network blocks, wherein each convolutional neural network block comprises a stride-two convolutional layer and a stride-one rectified linear unit activation layer. For example, the neural network can include a plurality of convolutional neural network blocks comprising a stride-2 convolutional layer and a stride-1 convolutional layer, and a convolutional neural network layer comprising a plurality of channels equal to a number of points indicating predicted compressions for the plurality of possible compressed versions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
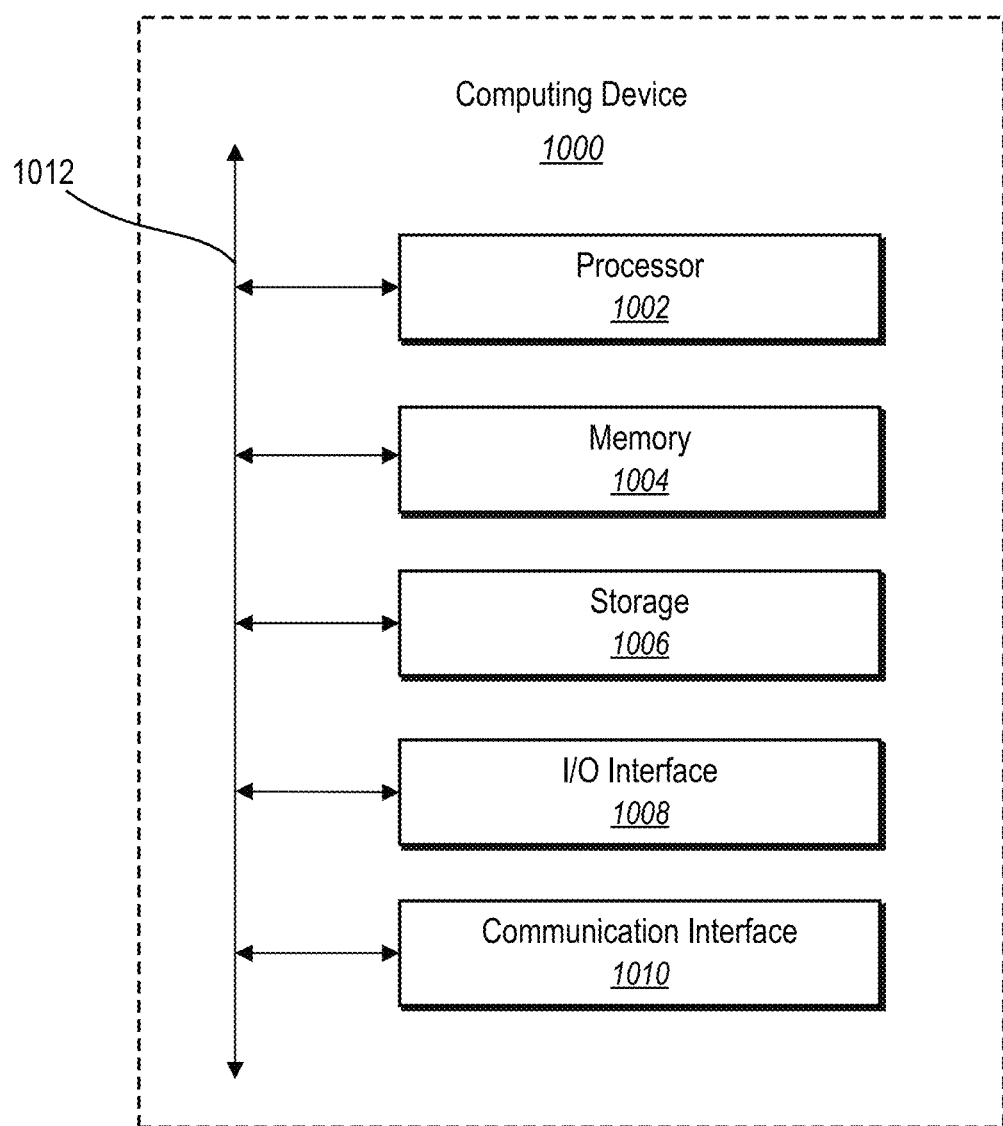
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the system(s) of FIG. 1. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions for dynamically modifying workflows, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions for performing the methods described herein.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
    generate, utilizing a neural network given an uncompressed digital image as input, a plurality of points indicating predicted compression distortions for a plurality of possible compressed versions of the uncompressed digital image;

determine a perceptual distortion characteristic curve for the uncompressed digital image from the plurality of points generated by the neural network;

select, based on the perceptual distortion characteristic curve, a compression setting that meets a perceptual quality threshold; and generate a compressed digital image utilizing the selected compression setting that meets the perceptual quality threshold.

2. The non-transitory computer readable storage medium as in claim 1, further comprising instructions that, when executed by the at least one processor, cause the computing device to generate the plurality of points by generating, utilizing the neural network, a plurality of Haar wavelet-based perceptual similarity index values representing predicted perceptual similarities between the uncompressed digital image and the plurality of possible compressed versions of the uncompressed digital image.

3. The non-transitory computer readable storage medium as in claim 1, further comprising instructions that, when executed by the at least one processor, cause the computing device to generate the plurality of points by generating the plurality of points for a plurality of possible compressed versions corresponding to compression settings equidistant along a compression quality scale.

4. The non-transitory computer readable storage medium as in claim 3, further comprising instructions that, when executed by the at least one processor, cause the computing device to determine the perceptual distortion characteristic curve by:

fitting a polynomial curve to the plurality of points; and determining additional predicted compression distortions for a plurality of additional possible compressed versions by interpolating the polynomial curve across the compression quality scale.

5. The non-transitory computer readable storage medium as in claim 1, further comprising instructions that, when executed by the at least one processor, cause the computing device to generate the plurality of points by:

generating, for a possible compressed version of the plurality of possible compressed versions, a set of predicted points corresponding to a plurality of patches of the possible compressed version; and selecting, for the possible compressed version, a final predicted point from the set of predicted points.

6. The non-transitory computer readable storage medium as in claim 1, further comprising instructions that, when executed by the at least one processor, cause the computing device to select the compression setting by performing a bisection search over compression settings within a compression setting scale to determine a lowest compression setting corresponding to a predicted perceptual similarity to the uncompressed digital image that meets the perceptual quality threshold.

7. The non-transitory computer readable storage medium as in claim 1, further comprising instructions that, when executed by the at least one processor, cause the computing device to learn parameters of the neural network by:

generating, utilizing the neural network, a plurality of predicted compression distortion points for a plurality of compressed versions of a digital image relative to an uncompressed version of the digital image;

determining a quality prediction loss based on a difference between the plurality of predicted compression distortion points and a plurality of ground-truth compression distortion points for the plurality of compressed versions of the digital image; and learning the parameters of the neural network based on the quality prediction loss.

8. The non-transitory computer readable storage medium as in claim 1, wherein the neural network comprises a plurality of convolutional neural network blocks, wherein each convolutional neural network block comprises a stride-two convolutional layer and a rectified linear unit activation layer.

9. A system comprising:

at least one computer memory device comprising an uncompressed digital image; and one or more servers configured to cause the system to:

generate, utilizing a neural network, a plurality of points indicating predicted compression distortions for a plurality of possible compressed versions of the uncompressed digital image by generating a predicted perceptual similarity value for each of the plurality of possible compressed versions of the uncompressed digital image;

determine a perceptual distortion characteristic curve for the uncompressed digital image from the plurality of points generated by the neural network by fitting the plurality of points to a curve across a compression quality scale;

select, based on the perceptual distortion characteristic curve, a compression setting that meets a perceptual quality threshold; and generate a compressed digital image utilizing the selected compression setting that meets the perceptual quality threshold.

10. The system as in claim 9, wherein the one or more servers are further configured to cause the system to generate the plurality of points by generating the plurality of points for a plurality of possible compressed versions corresponding to compression settings spaced at intervals equal to a predetermined value along a compression quality scale.

11. The system as in claim 10, wherein the one or more servers are further configured to cause the system to generate the plurality of points by:

generating a first predicted perceptual similarity value for a first possible compressed version of the uncompressed digital image associated with a first compression setting; and generating a second predicted perceptual similarity value for a second possible compressed version of the uncompressed digital image associated with a second compression setting, wherein the first compression setting is separated from the second compression setting by the predetermined value.

12. The system as in claim 9, wherein the one or more servers are further configured to cause the system to determine predicted perceptual similarity values for additional possible compression settings across the compression quality scale by interpolating the perceptual distortion characteristic curve at each of the additional possible compression settings.

13. The system as in claim 9, wherein the one or more servers are further configured to cause the system to determine the perceptual distortion characteristic curve by fitting a multi-degree polynomial to the plurality of points, wherein the multi-degree polynomial comprises the plurality of points and a plurality of additional points indicating predicted compression distortions for a plurality of additional possible compressed versions of the uncompressed digital image corresponding to compression settings between the plurality of points.

14. The system as in claim 9, wherein the one or more servers are further configured to cause the system to select the compression setting by:
   determining whether a predicted perceptual similarity value for a first possible compressed version associated with a first compression setting meets the perceptual quality threshold;
   in response to determining that the predicted perceptual similarity value for the first possible compressed version meets the perceptual quality threshold, bisecting a plurality of remaining compression settings to identify a second possible compressed version associated with a second compression setting; and
   determining whether a predicted perceptual similarity value for the second possible compressed version associated with the second compression setting meets the perceptual quality threshold.

15. The system as in claim 14, wherein the one or more servers are further configured to cause the system to select the compression setting by successively determining whether predicted perceptual similarity values for possible compressed versions meet the perceptual quality threshold in a bisection search to determine a lowest compression setting for which a predicted perceptual similarity value meets the perceptual quality threshold.

16. The system as in claim 9, wherein the one or more servers are further configured to cause the system to learn parameters of the neural network by:
   determining a quality prediction loss based on differences between predicted compression distortion points for a plurality of previously compressed versions of a digital image and ground-truth compression distortion points for the previously compressed versions of the digital image; and
   learning the parameters of the neural network based on the quality prediction loss.

17. The system as in claim 9, wherein the neural network comprises:
   a plurality of convolutional neural network blocks comprising a stride-2 convolutional layer and a stride-1 convolutional layer; and
   a convolutional neural network layer comprising a plurality of channels equal to a number of points indicating predicted compressions for the plurality of possible compressed versions.

18. A computer-implemented method comprising:
   generating, utilizing a neural network given an uncompressed digital image as input, a plurality of points indicating predicted compression distortions for a plurality of possible compressed versions of the uncompressed digital image;
   determining a perceptual distortion characteristic curve for the uncompressed digital image from the plurality of points generated by the neural network;
   selecting, by the at least one processor and based on the perceptual distortion characteristic curve, a compression setting that meets a perceptual quality threshold; and
   generating, by the at least one processor, a compressed digital image utilizing the selected compression setting that meets the perceptual quality threshold.

19. The computer-implemented method as in claim 18, wherein selecting the compression setting comprises:
   performing a bisection search across a vector of predicted compression distortions from the perceptual distortion characteristic curve across a compression quality scale; and
   determining a lowest compression setting comprising a predicted perceptual quality that meets the perceptual quality threshold.

20. The computer-implemented method as in claim 19, wherein generating the compressed digital image comprises compressing the uncompressed digital image utilizing a plurality of compression parameters corresponding to the lowest compression setting.

* * * * *